United States Patent [19]

Matsui et al.

[11] Patent Number: 4,893,480

[45] Date of Patent: Jan. 16, 1990

[54] REFRIGERATION CYCLE CONTROL APPARATUS

[75] Inventors: Katsumasa Matsui; Masahiro Ohba, both of Okazaki; Toru Kakehi, Nagoya; Kazutoshi Nishizawa, Toyoake, all of Japan

[73] Assignee: Nippondenso Co., Ltd., Kariya, Japan

[21] Appl. No.: 167,103

[22] Filed: Mar. 11, 1988

[30] Foreign Application Priority Data

| | | |
|---|---|---|
| Mar. 13, 1987 [JP] | Japan | 62-59192 |
| May 12, 1987 [JP] | Japan | 62-115268 |
| May 12, 1987 [JP] | Japan | 62-115269 |

[51] Int. Cl.[4] .................................. F25B 41/04
[52] U.S. Cl. .................................. 62/225; 62/228.5; 62/229; 364/151
[58] Field of Search .............. 62/225, 212, 211, 133, 62/229, 228.4, 228.5, 244, 243; 364/151, 557, 551.01, 149, 150, 165

[56] References Cited

U.S. PATENT DOCUMENTS

| | | | |
|---|---|---|---|
| 4,395,203 | 7/1983 | Takada | 62/133 X |
| 4,494,184 | 1/1985 | Crevel | 364/178 |
| 4,563,734 | 1/1986 | Mori et al. | 364/151 X |
| 4,607,326 | 8/1986 | Mori et al. | 364/151 X |
| 4,667,480 | 5/1987 | Bessler | 62/244 X |
| 4,674,292 | 6/1987 | Ohya et al. | 62/225 X |
| 4,686,835 | 8/1987 | Alsenz | 62/225 X |
| 4,696,167 | 9/1987 | Matsui et al. | 62/180 |

OTHER PUBLICATIONS

"Automotive Climate Control" by Tsutomu TABE et al., CONTROL SYSTEMS MAGAZINE, Oct. 1986, vol. 6, No. 5.

*Primary Examiner*—Harry B. Tanner
*Attorney, Agent, or Firm*—Cushman, Darby & Cushman

[57] ABSTRACT

A refrigeration cycle or an air conditioner including a refrigeration cycle is subjected to feedback control based on modern control theory. An apparatus controlling a controlled object, that is, the refrigeration cycle of the air conditioner including the refrigeration cycle, is formed as an optimal regulator. A controlled input to the controlled object includes a capacity of a compressor or a degree of opening of an expansion valve. A control output from the controlled object includes a temperature of air at a point downstream of the evaporator or a superheat of refrigerant. Feedback gains are predetermined by use of dynamic models constructed for respective steady operation states of the controlled object.

22 Claims, 15 Drawing Sheets

REFRIGERATION CYCLE CONTROL APPARATUS

BACKGROUND OF THE INVENTION

This invention relates to a refrigeration cycle control apparatus and also a control apparatus for an air conditioner including a refrigeration cycle Some automotive air conditioners use a compressor of the variable capacity type. The capacity of the compressor is adjusted in accordance with the load on the air conditioner This design allows a reduced loss of energy driving the compressor and ensures an improved feeling in air conditioning.

U.S. Pat. No. 4,696,167 discloses automotive air conditioners which use modern control theory to obtain excellent air conditioning characteristics.

SUMMARY OF THE INVENTION

It is a first object of this invention to provide a refrigeration cycle or air conditioner control apparatus which has excellent response characteristics.

It is a second object of this invention to provide a stable refrigeration cycle or air conditioner control apparatus.

It is a third object of this invention to provide a refrigeration cycle or air conditioner control apparatus which allows energy saving.

According to this invention, a refrigeration cycle or an air conditioner including a refrigeration cycle is subjected to feedback control based on modern control theory. An apparatus controlling a controlled object, that is, the refrigeration cycle or the air conditioner including the refrigeration cycle, is formed as an optimal regulator. A controlled input to the controlled object includes a capacity of a compressor or a degree of opening of an expansion valve. A control output from the controlled object includes a temperature of air at a point downstream of the evaporator or a superheat of refrigerant. Feedback gains are predetermined by use of dynamic models constructed for respective steady operation states of the controlled object.

DESCRIPTION OF THE FIRST PREFERRED EMBODIMENT

Figure 1:
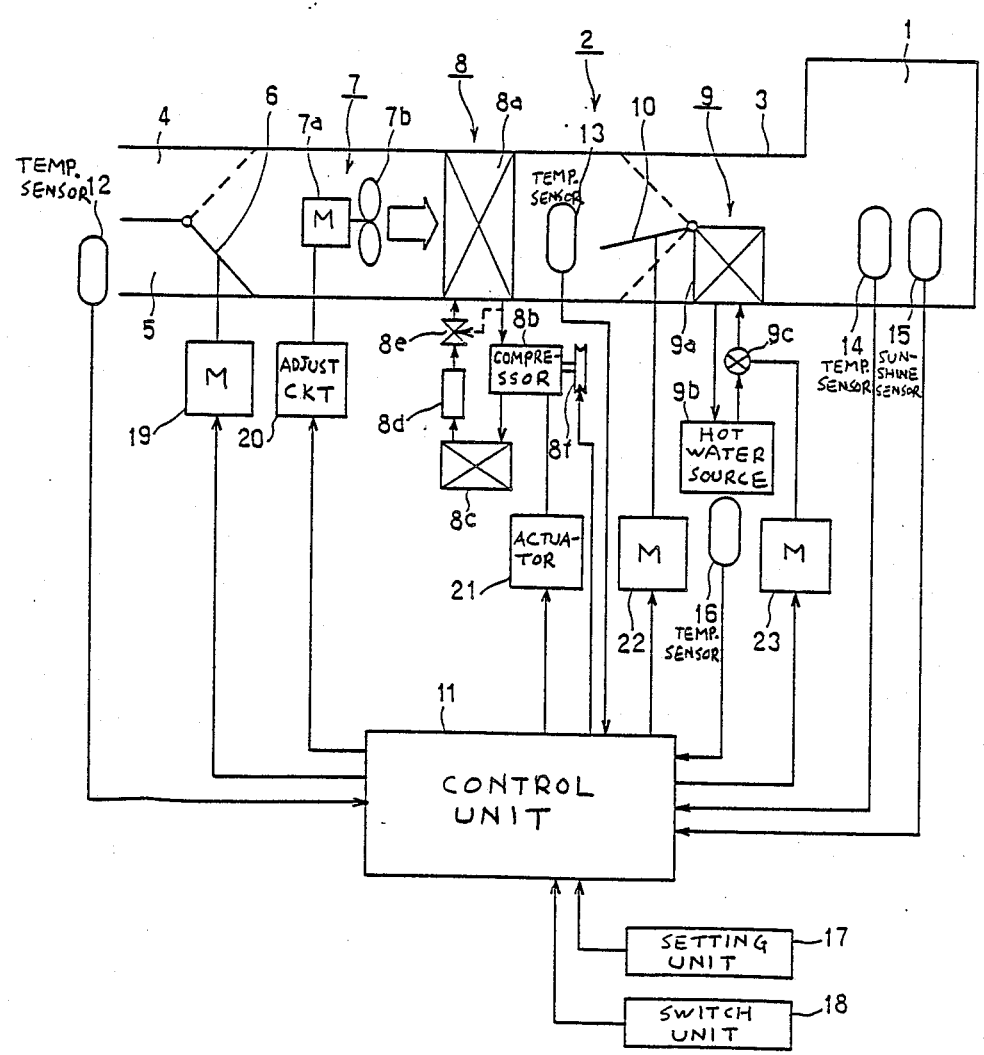
FIG. 1 is a diagram of an automotive air conditioner including a refrigeration cycle control apparatus according to a first embodiment of this invention.

With reference to FIG. 1, an automotive air conditioner 2 acting on an interior or passenger compartment 1 of a vehicle includes an air duct 3 having an outlet or downstream end opening into the vehicle interior 1. The duct 3 has first and second inlets or upstream ends 4 and 5 leading from the vehicle interior 1 and an exterior of the vehicle respectively. The first inlet 4 allows air to move from the vehicle interior 1 into the duct 3. The second inlet 5 allows air to move from the vehicle exterior into the duct 3. A damper 6 disposed within the duct 3 is movable between an inside air mode position and an outside air mode position shown by the solid line and the broken line respectively. When the damper 6 assumes the inside air mode position, the damper 6 unblocks the first inlet 4 but blocks the second inlet 5 so that air is allowed to move from the vehicle interior 1 into the duct 3 via the first inlet 4. When the damper 6 assumes the outside air mode position, the damper 6 unblocks the second inlet 5 but blocks the first inlet 4 so that air is allowed to move from the vehicle exterior into the duct 3 via the second inlet 5. A blower 7 composed of a combination of a motor 7a and a fan 7b is disposed within a region of the duct 3 downstream of the damper 6. The blower 7 serves to draw air into the duct 3 via the inlet 4 or 5 and to then drive the air toward the vehicle interior 1 along the duct 3.

A refrigeration cycle 8 includes an evaporator 8a, a compressor 8b of the variable capacity type, a condenser 8c, a receiver 8d, and an expansion valve 8e. An electromagnetic clutch 8f selectively couples and uncouples a drive shaft of the compressor 8b to and from a mechanical power source such as an automotive engine. The evaporator 8a is disposed within a region of the duct 3 downstream of the blower 7. The degree of opening of the expansion valve 8e is controlled in accordance with a temperature of an outlet of the evaporator 8a which is detected via a temperature sensing tube (not shown in FIG. 1). In other words, the degree of opening of the expansion valve 8e is controlled in accordance with a gas pressure within the temperature sensing tube. Refrigerant circulates through the refrigeration cycle 8 so that heats are exchanged between the air within the duct 3 and the refrigerant within the evaporator 8a of the refrigeration cycle 8.

High-temperature and high-pressure gas refrigerant derived via the compressor 8b is cooled and liquefied by the condenser 8c. During the liquefaction of the refrigerant, thermal energy moves from the refrigerant to environments of the condenser 8c. Then, the refrigerant moves from the condenser 8c to the expansion valve 8e by way of the receiver 8d. The refrigerant is atomized by the expansion valve 8e and is then vaporized by the evaporator 8a. The vaporization of the refrigerant cools the air surrounding the evaporator 8a. The vaporized refrigerant returns to the compressor 8b.

A heating unit 9 includes a heater core 9e, a hot water source 9b, and a water valve 9c. The heater core 9a is disposed within a region of the duct 3 downstream of the evaporator 8a. Hot water is supplied to the heater core 9a from the source 9b via the water valve 9c. The water valve 9c adjusts the rate of supply of hot water to the heater core 9a. The hot water heats air passing through the heater core 9a. After the heating process, the water returns from the heater core 9a to the source 9b. The hot water source 9b consists of an automotive engine, and engine coolant is used as hot water. An air mix damper 10 movably disposed within a region of the duct 3 between the evaporator 8a and the heater core 9a adjusts the ration between the rate of air flow passing through the heater core 9a and the rate of air flow bypassing the heater core 9a, thereby controlling the temperature of air discharged into the vehicle interior 1. The ratio between the rate of air flow passing through the heater core 9a and the rate of air flow bypassing the heater core 9a depends on the position of the air mix damper 10.

A control unit 11 includes a microcomputer composed of a central processing unit (CPU), a read-only memory (ROM), a random-access memory (RAM), and an input and output (I/O) port connected via buses.

A sensor 12 disposed outside the vehicle interior 1 outputs a signal representing an atmospheric temperature. A sensor 13 disposed within the duct 3 outputs a signal representing a temperature of air at a point downstream of the evaporator 8a but upstream of the heater core 9a. The air temperature detected by the sensor 13 is referred to as the evaporator downstream temperature. A sensor 14 disposed within the vehicle interior 1 outputs a signal representing a temperature of air within the vehicle interior 1. A sensor 15 disposed within the vehicle interior 1 outputs a signal representing the intensity of sunshine. A sensor 16 provided to the hot water source 9b outputs a signal representing a temperature of hot water. A manually controllable setting unit 17 outputs a signal representing an adjustable target temperature of the vehicle interior 1. A unit 18 including various manual switches outputs a signal designating whether the air conditioner 2 should be activated or deactivated, a signal designating a rate of air flow into the vehicle interior 1, a signal designating a position of the damper 6, and other signals. The output signals from the devices 12–18 are applied to the control unit 11.

A servo motor 19 drives the damper 6. The control unit 11 outputs a control signal to the servo motor 19 so that the damper 6 is controlled via the control signal. A circuit 20 adjusts the speed of the blower motor 7a. The control unit 11 outputs a control signal to the circuit 20 so that the speed of the blower motor 7a is controlled via the control signal. An actuator 21 drives a capacity varying mechanism of the compressor 8b. The control unit 11 outputs a control signal to the actuator 21 so that the capacity of the compressor 8b is controlled via the control signal. A servo motor 22 drives the air mix damper 10. The control unit 11 outputs a control signal to the servo motor 22 so that the position of the air mix damper 10 is controlled via the control signal. A servo motor 23 drives the water valve 9. The control unit 11 outputs a control signal to the servo motor 23 so that the water valve 9 is controlled via the control signal.

The refrigeration cycle 8 and the control unit 11 will be described in more detail hereinafter.

Figure 2:
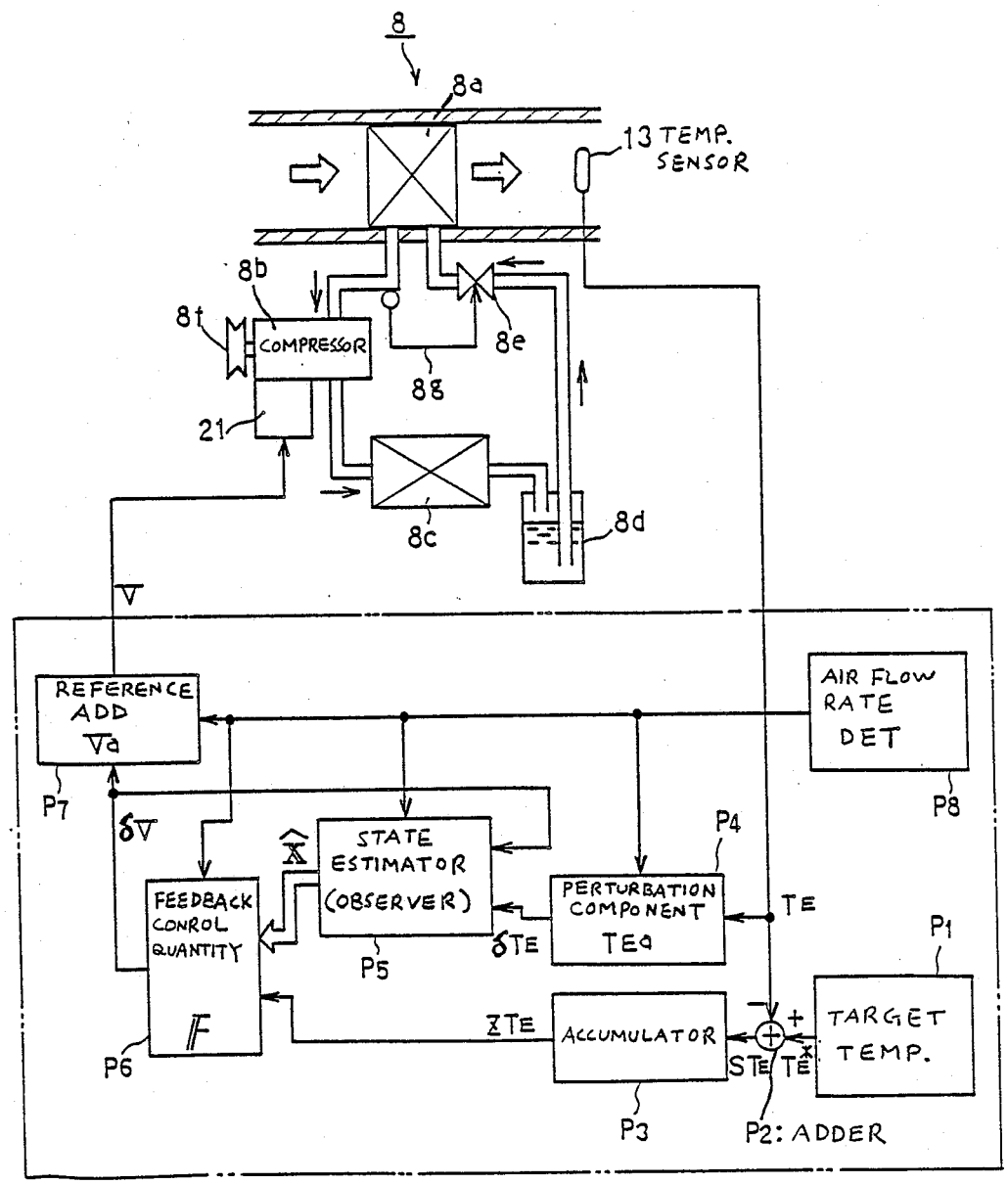
FIG. 2 is a diagram of the refrigeration cycle and the refrigeration cycle control apparatus of FIG. 1.

As shown in FIG. 2, a temperature sensing tube 8g adjusts the degree of opening of the expansion valve 8e in accordance with the temperature of refrigerant at an outlet of the evaporator 8a.

A system for controlling the refrigeration cycle 8 is formed as an integral-added optimal regulator adjusting the evaporator downstream temperature TE detected by the sensor 13.

As shown in FIG. 2, the actual air temperature TE is fed to an adder P2 and a section P4 of the integral-added optimal regulator. A section P1 outputs a target evaporator downstream TE* to the adder P2. The adder P2 derives a difference STE between the actual and target evaporator downstream temperatures TE and TE*, the difference STE being outputted to an accumulator P3. The section P3 accumulates the difference STE and thereby derives an accumulation value ZTE outputted to a section P6.

The refrigeration cycle 8 is nonlinear. A linear approximation is used in handling the behavior of the refrigeration cycle 8 as described hereinafter. The total range of the variable state of the refrigeration cycle 8 is divided into portions around respective steady points TEa and Va where the refrigeration cycle 8 can be approximately handled as being linear with respect to the steady points TEa and Va. Perturbation components $\delta TE$ and $\delta V$ measured from the respective steady points TEa and Va are introduced in handling control quantities.

The section P4 derives a perturbation component $\delta TE$ from the actual evaporator downstream TE and the steady point TEa. The perturbation component $\delta TE$ is outputted to a state estimator or an observer P5. The observer P5 estimates state variables $\hat{X}$ the basis of the perturbation components $\delta TE$ and $\delta V$. The state variables $\hat{X}$ represent the internal state of the refrigeration cycle 8. The observer P5 receives the perturbation component $\delta V$ from the section P6. The estimated state variables $\hat{X}$ are outputted to the section P6. The section P6 derives expanded state variables from the input state variables by use of the accumulation value ZTE. The section P6 determines a feedback controlled quantity $\delta V$ of the capacity of the compressor 8b by multiplying the expanded state variables X by predetermined feedback gains F. The feedback control quantity $\delta V$ consists of a perturbation component measured from a steady point Va. The feedback control quantity $\delta V$ is outputted to a section P7 and the observer P5. The section P7 calculates a final or command controlled quantity V of the capacity of the compressor 8b which equals the sum of the steady point value Va and the perturbation component $\delta V$. A section P8 controls the sections P4, P5, P6, and P7 in accordance with an operating condition of the refrigeration cycle 8, the rate of air flow through the evaporator 8a in this embodiment. Specifically, values of the optimal feedback gains, values of parameters of the observer, and the steady points are changed in accordance with the rate of air flow through the evaporator 8a.

The integral-added optimal regulator is designed as follows.

(A) Modeling of Controlled System

The behavior of a controlled system, that is, the refrigeration cycle 208 or a system adjustably determining the temperature of air at a point immediately downstream of the evaporator 8a, is expressed by the following state and output equations.

$$X(k) = A \cdot X(k-1) + B \cdot u(k-1) \tag{1}$$

$$y(k) = C \cdot X(k) \tag{2}$$

where the character X (k) repersents state variables of the refrigeration cycle 8; the character u (k) represents an input vector or controlled input quantities of the refrigeration cycle 8, the capacity V of the compressor 8b in this embodiment; the character y (k) represents an output vector or control output of the refrigeration cycle 8, that is, the air temperature TE at a point immediately downstream of the evaporator 8a; and the character k represents the number of times of sampling.

Figure 3:
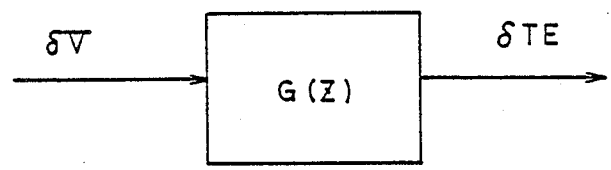
FIG. 3 is a block diagram of a one-input one-output system composed of the refrigeration cycle of FIGS. 1 and 2.

FIG. 3 shows the refrigeration cycle 8 as a one-input one-output system by use of a transfer function G(z), where the character z represents z-transform of sampled values of the input and output signals. The transfer function G(z) has appropriate dimensions.

In cases where the determination of a physical model of a system such as the refrigeration cycle 8 is extremely difficult, a transfer function G(z) can be determined through a simulation called a system identification. The system was identified by least squares method as follows.

Under preset steady operation states of the refrigeration cycle 8, a suitable test signal corresponding to a compressor capacity perturbation quantity $\delta V$ was applied to the compressor control actuator 21 to vary the input to the system. As a result, the capacity of the compressor 8b was varied by the perturbation quantity $\delta V$. The output of the system, that is, the evaporator downstream temperature TE, varied in response to the variation in the compressor capacity. During and after the application of the test signal, the input variation value $\delta V$ and the output variation value $\delta TE$ were sampled a preset number of times N. The sampled values formed input data series $\{u(i)\} = \{\delta Vi\}$ and output data series $\{y(i)\} = \{\delta TEi\}$ where $i = 1, 2, 3, \ldots, N$. In this case, the system is regarded as a one-input one-output system so that the transfer function G(z) of the system is determined by the following equations.

$$G(z) = B(z^{-1})/A(z^{-1}) \tag{3}$$

$$G(z) = (b0 + b1 \cdot z^{-1} + \ldots + bn \cdot z^{-n})/(1 + a1 \cdot z^{-1} + a2 \cdot z^{-2} + \ldots + an \cdot z^{-n}) \tag{4}$$

where the character $z^1$ denotes a unit delay or shift operator, and $z^{-1} \cdot X(k) = X(k-1)$.

The system transfer function G(z) can be derived by determining the parameters a1 ... an and b0 ... bn of the equation (4) in accordance with the input and output data series $\{u(i)\}$ and $\{y(i)\}$. In the system identification using least squares method, these parameters a1 ... an and b0 ... bn are determined or chosen so that the following summation J0 can be minimized.

$$J0 = \sum_{k=n}^{N} [(y(k) + a1 \cdot y(k-1) + \ldots + an \cdot y(k-n)) - \tag{5}$$

$$(b0 \cdot u(k) + b1 \cdot u(k-1) + \ldots + bn \cdot u(k-n))]^2$$

Figure 4:
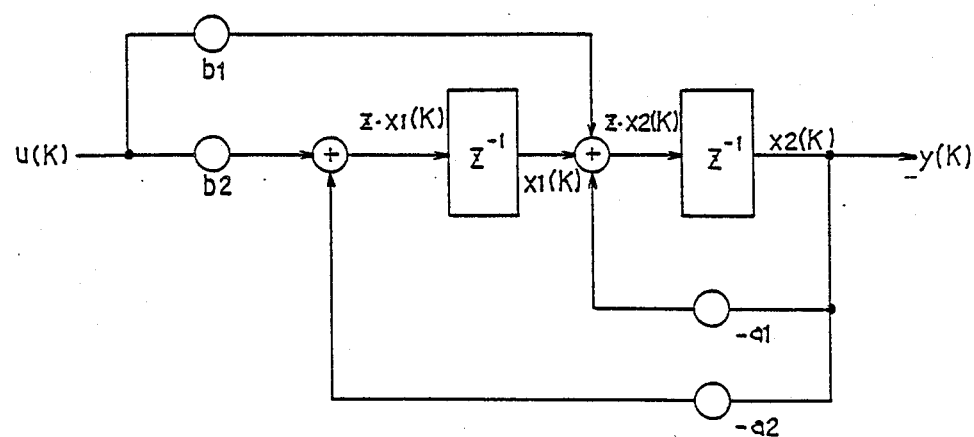
FIG. 4 is a signal flow diagram of a dynamic model of the refrigeration cycle of FIGS. 1 and 2.

In this embodiment, the parameters were determined at the value n equal to 2. In this case, signal flow in the system has a manner as shown in FIG. 4, and the state variables are composed of $[X1(k) \ X2(k)]^T$ and the associated state and output equations are indicated below.

$$\begin{bmatrix} X1(k+1) \\ X2(k+1) \end{bmatrix} = z \begin{bmatrix} X1(k) \\ X2(k) \end{bmatrix} = \tag{6}$$

$$\begin{bmatrix} 0 & -a2 \\ 1 & -a1 \end{bmatrix} \begin{bmatrix} X1(k) \\ X2(k) \end{bmatrix} + \begin{bmatrix} b2 \\ b1 \end{bmatrix} u(k)$$

$$y(k) = [0 \ 1] \begin{bmatrix} X1(k) \\ X2(k) \end{bmatrix} \tag{7}$$

Accordingly, in the case where the system is regarded as a one-input one-output system, system parameters A, B, and C are given as follows.

$$\left. \begin{array}{l} A = \begin{bmatrix} 0 & -a2 \\ 1 & -a1 \end{bmatrix} \\ B = [b2 \ b1]^T \\ C = [0 \ 1] \end{array} \right\} \tag{8}$$

In this way, the dynamic model of the system of this embodiment was determined through the system identification. The determination of the dynamic model relies on the fact that an operation state of the refrigeration cycle 8 near a preset steady operation state can be expressed by linear approximation with respect to the preset steady operation state. Accordingly, in connection with each of a plurality of steady operation states, a transfer function G(z) was determined in the previously-mentioned method so that vectors A, B, and C in the state equation (1) and the output equation (2) were derived. In each of these dynamic models, the input and the output have a fixed relationship in terms of a perturbation quantity $\delta$.

(B) Designing of Observer

There are various observers such as a minimal order observer or a full order observer. In this embodiment, the observer P5 was designed as a full order observer.

Figure 5:
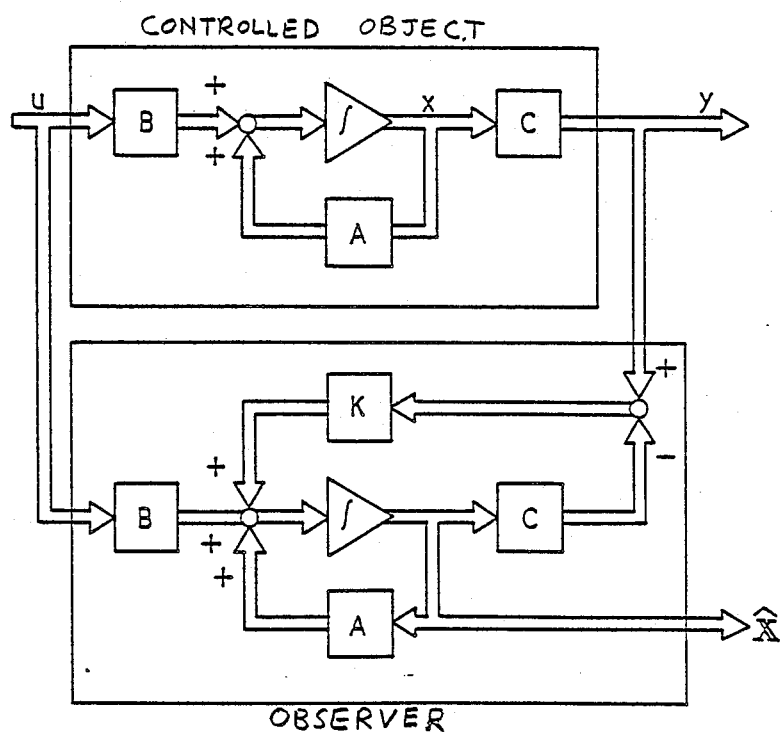
FIG. 5 is a block diagram of a full order observer.

As shown in FIG. 5, in the full order observer, estimated state variables $\hat{X}(k)$ are given in the following equation.

$$\begin{aligned} \hat{X}(k) &= A \cdot \hat{X}(k-1) + B \cdot u(k-1) + K(y(k-1) - \\ &\quad C \cdot \hat{X}(k-1)) \\ &= (A - K \cdot C) \hat{X}(k-1) + K \cdot y(k-1) + \\ &\quad B \cdot u(k-1) \end{aligned} \tag{9}$$

where the character K represents feedback gains.

It is proved that when the feedback gains K are chosen to stabilize the matrix "A−K·C" and the absolute values of the eigen values of the matrix "A−K·C" are all made smaller than 1, $\hat{X}(k) \to X(k)$ as $k \to \infty$.

The feedback gains K were chosen as above and parameters were introduced as expressed in the following equations.

$$A_o \triangleq A - L \cdot C$$

$$K \triangleq Q \qquad (10)$$

$$B_o \triangleq B$$

The equation (9) is thus converted into the following equation.

$$\hat{X}(k) = A_o \cdot \hat{X}(k-1) + L \cdot y(k-1) + B_o \cdot u(k-1) \qquad (11)$$

The parameters A o, L, and B o were determined for respective models corresponding to steady operation states.

(C) Expansion of System

Since the controlled object in this embodiment is of a servo type having a variable target evaporator downstream TE, the system was expanded by use of the accumulation value. Specifically, expanded state variables X (k) were introduced by adding the accumulation value "Z (k)=ZTE(k)" to the original state variables $\hat{X}(k)$ as expressed in the following equation.

$$\hat{X}(k) = [X(k)\ ZTE(k)]^T \qquad (12)$$

(D) Calculation of Optimal Feedback Gains F

Since the way of obtaining optimal feedback gains F with respect to expanded state variables X (k) is described in detail in some books such as "Linear System Control Theory" written by Katsuhisa Furuta, published from Shokodo Japan in 1976, only the results are shown hereinafter. The expanded system determined in the section (C) is now expressed as follows.

$$\begin{bmatrix} \hat{X}(k) \\ Z(k) \end{bmatrix} = \begin{bmatrix} A & 0 \\ -C & 0 \end{bmatrix} \begin{bmatrix} \hat{X}(k-1) \\ Z(k-1) \end{bmatrix} + \qquad (13)$$

$$\begin{bmatrix} B \\ 0 \end{bmatrix} u(k-1) + \begin{bmatrix} 0 \\ 1 \end{bmatrix} y^*(k-1)$$

$$y(k) = [C\ 0] \begin{bmatrix} \hat{X}(k) \\ Z(k) \end{bmatrix}. \qquad (14)$$

When the order of the state variables $\hat{X}(k)$ was 2, the following equations were derived.

$$\hat{X}(k) = [\hat{X}1(k)\ \hat{X}2(k)]^T$$

$$Z(k) = ZTE(k)$$

$$u(k) = \delta V$$

$$y(k) = \delta TE$$

$$y^*(k) = \delta TE^*$$

where the characters δTE and δV represent perturbation components equal to deviations from steady points.

Control problem of the integral-added optimal regulator can be solved by determining optimal control input, that is, operating condition u*(k), at which the following performance index J is minimized.

$$J = \sum_{k=0}^{\infty} [\delta y^T(k) \cdot Q \cdot \delta y(k) + \delta u^T(k) \cdot R \cdot \delta u(k)] \qquad (15)$$

where the letters Q and R denote weight parameter matrices and the letter k denotes a number of times of sampling which is zero at the initiation of the control. The right-hand side of the equation (15) takes a quadratic form where the matrices Q and R can be diagonal.

The optimal control input u*(k) was thus given as:

$$\begin{aligned} u^*(k) &= F \cdot X(k) \\ &= [F1\ F2] \cdot [\hat{X}(k)\ Z(k)]^T \\ &= F1 \cdot \hat{X}(k) + F2 \cdot Z(k) \end{aligned} \qquad (16)$$

where the feedback gains F 1, and F 2 were given as:

$$[F1\ F2] = R^{-1} \cdot B^T \cdot P \qquad (17)$$

The letter P denotes a solution of the following Riccati equation.

$$A^T \cdot P + P \cdot A + Q - P \cdot B \cdot R^{-1} \cdot B^T \cdot P = 0 \qquad (18)$$

The performance index J of the equation (15) is intended to minimize the deviation from the condition state values y (k), constituting control output and including the evaporator downstream temperature perturbation component δTE, while restricting movement of the operating condition values u (k)=δV constituting control input to the refrigeration cycle 8. The restriction on the operating condition values u (k) can be varied by changing the values in the weight matrices Q and R. Accordingly, the optimal feedback gains F were calculated by using the previously-determined dynamic models of the refrigeration cycle 8, that is, the matrices A, B, and C; choosing the arbitrary weight parameter matrices Q and R; solving the equation (18) and thus deriving the solution P; and finally referring to the equation (17).

The controlled input values u (k), that is, the control perturbation quantity δV, was determined by referring to the following equation.

$$\begin{aligned} u(k) &= F \cdot X(k) \\ &= F \cdot [\hat{X}(k)\ ZTE(k)]^T \end{aligned} \qquad (19)$$

In this embodiment, the feedback gains F were given as:

$$F = [-f1,\ -f2,\ +f3]$$

It should be noted that feedback gains F were determined for the respective dynamic models.

Modeling of the controlled system, designing of the observer, expansion of the system, and determination of the optimal feedback gains were performed beforehand on the basis of the formation of an integral-added optimal regulator (see FIG. 2). In the actual control of the refrigeration cycle 8, the control unit 11 uses only the results of the previously-performed processes.

Figure 6:
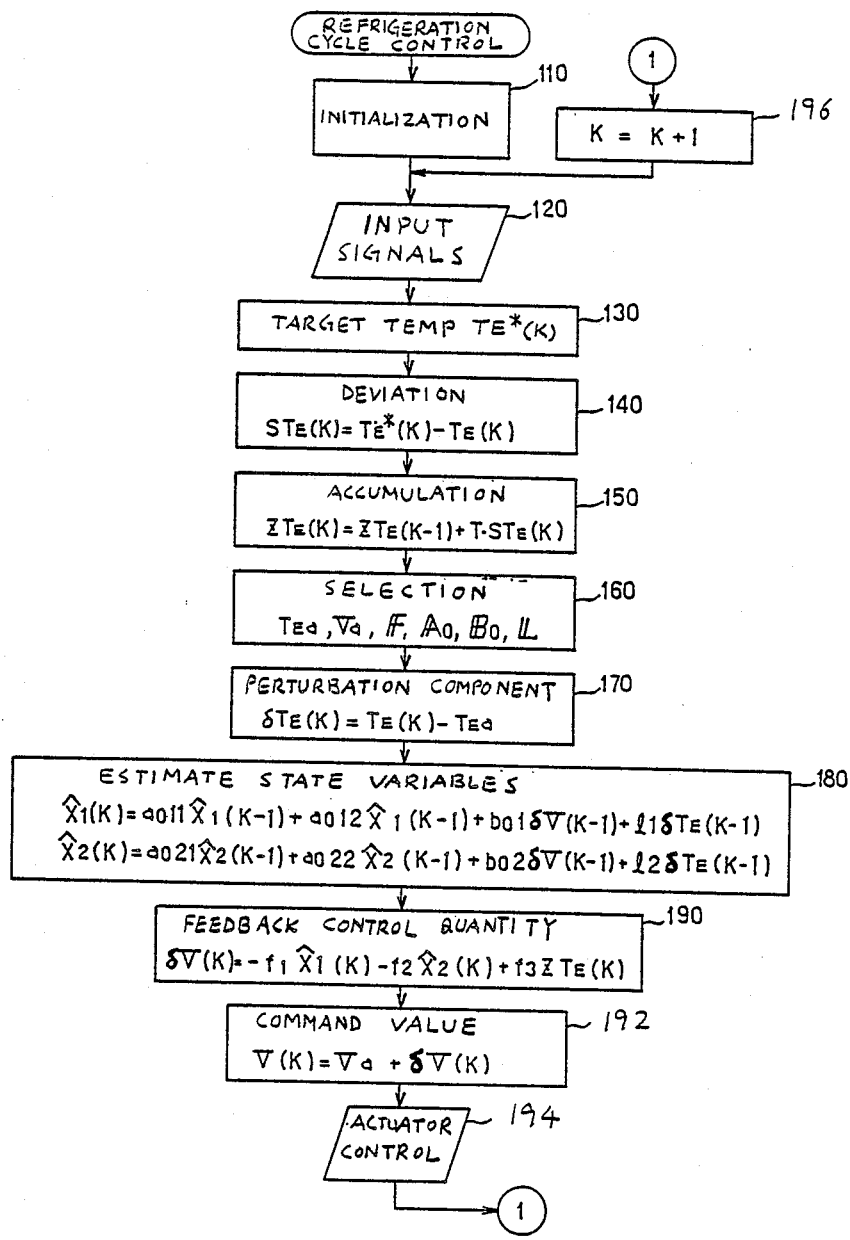
FIG. 6 is a flowchart of a program operating the control unit of FIG. 1.

The control unit 11 operates in accordance with a program stored in the internal ROM. FIG. 6 is a flowchart of a refrigeration cycle control section of this program. In the flowchart of FIG. 6, each adscript (k) represents that the associated value is determined in the current execution cycle of the program while each adscript (k−1) represents that the associated value is determined in the preceding execution cycle of the program.

The control unit 11 starts to execute the program when the air conditioner 2 is turned on. As shown in FIG. 6, a first step 110 of the refrigeration cycle control section of the program initializes variables and sets initial values. After the step 110, the program advances to a step 120.

The step 120 inputs the output signals from the sensors 12–16, the temperature setting unit 17, and the switch unit 18 and derives the current sensed values and states represented by these output signals and including the evaporator downstream temperature TE(k).

A step 130 following the step 120 calculates a target evaporator downstream TE*(k). Specifically, the target evaporator downstream temperature TE*(k) is determined in accordance with the target vehicle interior temperature, the inside air temperature, the atmospheric air temperature, the coolant temperature, and with whether or not dehumidification is required. The process in this step 130 corresponds to the target temperature setting section P1 of FIG. 2.

A step 140 following the step 130 calculates a deviation or difference STE(k) between the target and actual evaporator downstream temperatures TE*(k) and TE(k) by referring to the following equation.

$$STE(k) = TE(k) - TE(k) \qquad (20)$$

The process in this step 140 corresponds to the adder P2 of FIG. 2.

A step 150 following the step 140 accumulates the deviation STE(k) and thus derives an accumulated deviation ZTE(k) by referring to the following equation or statement.

$$ZTE(k) = ZTE(k-1) + T \cdot STE(k) \qquad (21)$$

where the letter T denotes a sampling period. The process in this step 150 corresponds to the accumulation section P3 of FIG. 2.

As described previously, a plurality of steady operation states were determined during the construction of the dynamic models of the refrigeration cycle 8. The predetermined steady operation states form base points within respective divided ranges where linear approximations with respect to the base points are regarded as being accurate.

A step 160 following the step 150 selects one of the predetermined steady operation states which is closest to the current state determined in accordance with the various input values and states derived in the step 120. In addition, the step 160 selects the steady point TEa of the evaporator downstream temperature, the steady point Va of the compressor capacity, the feedback gains F, and the parameters A o, B o, and L corresponding to the selected steady state. The process in this step 160 corresponds to the sections P4, P5, P6, P7, and P8 of FIG. 2.

In this embodiment, the rate of air flow through the duct 3 is used as an operation state. Accordingly, the process in the step 160 is performed in accordance with the control signal applied to the circuit 20 adjusting the speed of the blower motor 7a.

A step 170 following the step 160 derives a perturbation component δTE(k) of the evaporator downstream temperature TE(k) measured from the steady point TEa. Specifically, the perturbation component TE(k) is derived by referring to the following equation.

$$\delta TE(k) = TE(k) - TEa \qquad (22)$$

The process in the step 170 corresponds to the perturbation component deriving section P4.

A step 180 following the step 170 estimates state variables X (k) from the predetermined parameters A o, B o, and L selected in the step 160, the perturbation component δTE(k−1) derived in the step 170 during the preceding execution cycle of the program, the state variables $\hat{X}(k-1) = [\hat{X}1(k-1)\ \hat{X}2(k-1)]^T$ estimated in the preceding execution cycle of the program, and the perturbation component δV(k−1) of the compressor capacity determined in the preceding execution cycle of the program. Specifically, the state variable $\hat{X}$ (k) are determined by referring to the following equations based on the equation (11).

$$\begin{aligned}\hat{X}1(k) &= ao11 \cdot \hat{X}1(k-1) + ao12 \cdot \hat{X}1(k-1) + b01 \cdot \delta V(k-1) + l1 \cdot \delta TE(k-1) \\ \hat{X}2(k) &= a021 \cdot \hat{X}2(k-1) + ao22 \cdot \hat{X}2(k-1) \\ &\quad + bo2 \cdot \delta V(k-1) + l2 \cdot \delta TE(k-1)\end{aligned} \qquad (23)$$

The process in the step 180 corresponds to the state estimator P5 of FIG. 2.

A step 190 following the step 180 determines a controlled quantity, that is, the perturbation component δV(k) of the compressor capacity, in accordance with the state variables $\hat{X}$ (k) and the accumulated deviation ZTE(k) given in the steps 180 and 150 respectively. Since the feedback gains F are given as F = [−f1 −f2 +f3], the controlled perturbation quantity δV(k) is calculated by referring to the following equation based on the equation (19).

$$\delta V(k) = -f1 \cdot \hat{X}1(k) - f2 \cdot \hat{X}2(k) + f3 \cdot ZTE(k) \qquad (24)$$

The process in the step 190 corresponds to the feedback control quantity determination section P6.

A step 192 following the step 190 determines a command or target capacity V(k) of the compressor 8b in accordance with the compressor capacity perturbation component δV(k) and the steady point value Va given in the steps 190 and 160 respectively. Specifically, the target compressor capacity V(k) is calculated by referring to the following equation.

$$V(k) = Va + \delta V(k) \qquad (25)$$

The process in the step 192 corresponds to the reference value addition section P7 of FIG. 2.

A step 194 following the step 192 controls the compressor adjustment actuator 21 in accordance with the target compressor capacity V(k) so that the actual compressor capacity will be equal to the target compressor capacity V(k) given in the step 192.

After the step 194, the program returns to the step 120 by way of a step 196 which increments the sampling number k by "1". Accordingly, the series of the steps 120–196 is periodically reiterated.

Figure 7:
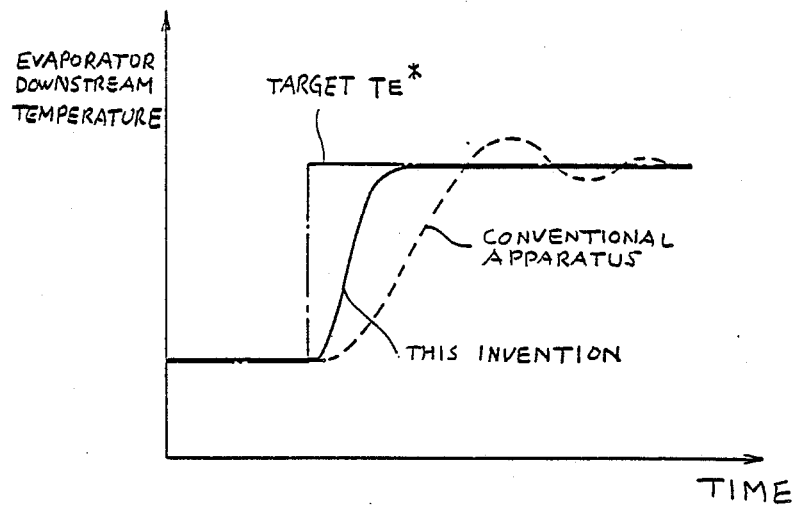
FIG. 7 is a diagram of time-dependent variations in target and actual evaporator downstream temperatures in the refrigeration cycle control apparatus of FIGS. 1 and 2 and a conventional refrigeration cycle control apparatus.

As shown by the dot-dash line of FIG. 7, it is now assumed that the target evaporator downstream temperature varies in a step function. As shown by the solid curve of FIG. 7, in this embodiment, the actual evaporator downstream temperature quickly follows the target evaporator downstream temperature without overshoot and undershoot. As shown by the dash curve of FIG. 7, in a conventional refrigeration cycle control apparatus without considering modern control theory, the actual evaporator downstream temperature slowly follows the target evaporator downstream temperature while exhibiting overshoot and undershoot.

Figure 8:
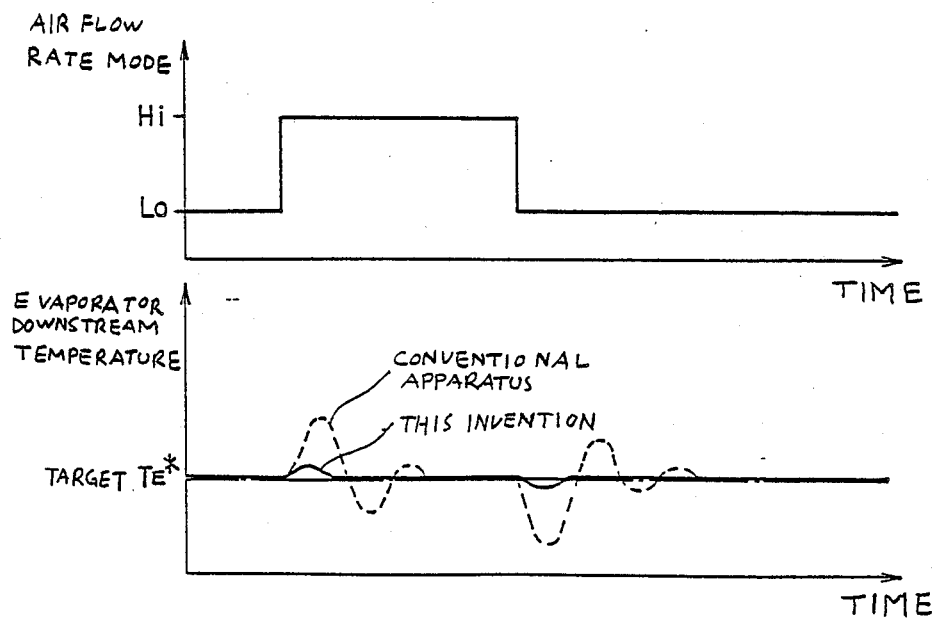
FIG. 8 is a diagram of time-dependent variations in air flow rate mode and actual evaporator downstream temperatures in the refrigeration cycle control apparatus of FIGS. 1 and 2 and the conventional refrigeration cycle control apparatus.

As shown in the upper part of FIG. 8, it is now assumed that the mode of the air flow rate changes from the low value "L" to the high value "H" and then returns to the low value "L". As shown by the solid curve of the lower part of FIG. 8, in this embodiment, the actual evaporator downstream temperature only slightly deviates from the targed evaporator downstream temperature immediately after the mode of the air flow rate changes. Such a reduced deviation of the actual evaporator downstream temperature from the target evaporator downstream temperature results from the fact that the steady point values TEa and Va, the feedback gains F, and the observer parameters A o, B o, and L are changed in accordance with the air flow rate. As shown by the broken curve of the lower part of FIG. 8, in the conventional refrigeration cycle control apparatus, the actual evaporator downstream temperature exhibits great overshoot and undershoot with respect to the target evaporator downstream temperature immediately after the mode of the air flow rate changes.

Figure 9:
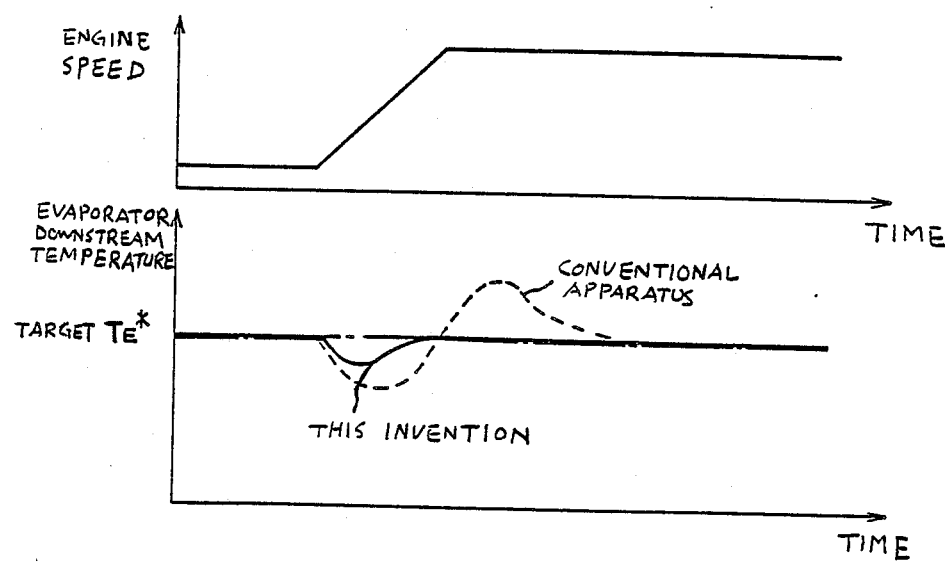
FIG. 9 is a diagram of time-dependent variations in engine speed and actual evaporator downstream temperatures in the refrigeration cycle control apparatus of FIGS. 1 and 2 and the conventional refrigeration cycle control apparatus.

As shown in the upper part of FIG. 9, it is now assumed that the engine speed varies at a constant rate during a certain interval. As shown by the solid curve in the lower part of FIG. 9, in this embodiment, the actual evaporator downstream temperature only slightly deviates from the targed evaporator downstream temperature during the change of the engine speed. As shown by the broken curve in the lower part of FIG. 9, in the conventional refrigeration cycle control apparatus, the actual evaporator downstream temperature exhibits great overshoot and undershoot with respect to the target evaporator downstream temperature during and immediately after the change of the engine speed.

As understood from FIGS. 7-9, this embodiment ensures excellent response characteristics, stable control, and reduced deviations of the actual controlled value from the target controlled value. The reduced deviations allow energy saving.

It should be noted that various modifications may be made in this embodiment. For example, an expansion valve having a continuously adjustable degree of opening may be used in place of the variable capacity compressor as means for adjusting the cooling ability. In addition, the adjustable expansion valve may be used together with the variable capacity compressor.

A temperature of a surface of the evaporator, a temperature of refrigerant within the evaporator, or a pressure of refrigerant within the evaporator may be used in place of the evaporator downstream temperature as a parameter representing a physical quantity related to the cooling ability of the heat exchanger.

The models of the refrigeration cycle determined through the system identification may be replaced by mathematical models obtained from the analyzation of thermal characteristics of respective portions of the refrigeration cycle.

System identifications without least squares method may be used. In addition, during the system identification, the order of the system may be greater than 2. Such a higher order improves control characteristics.

The target evaporator downstream temperature may be constant in a predetermined range.

DESCRIPTION OF THE SECOND PREFERRED EMBODIMENT

Figure 10:
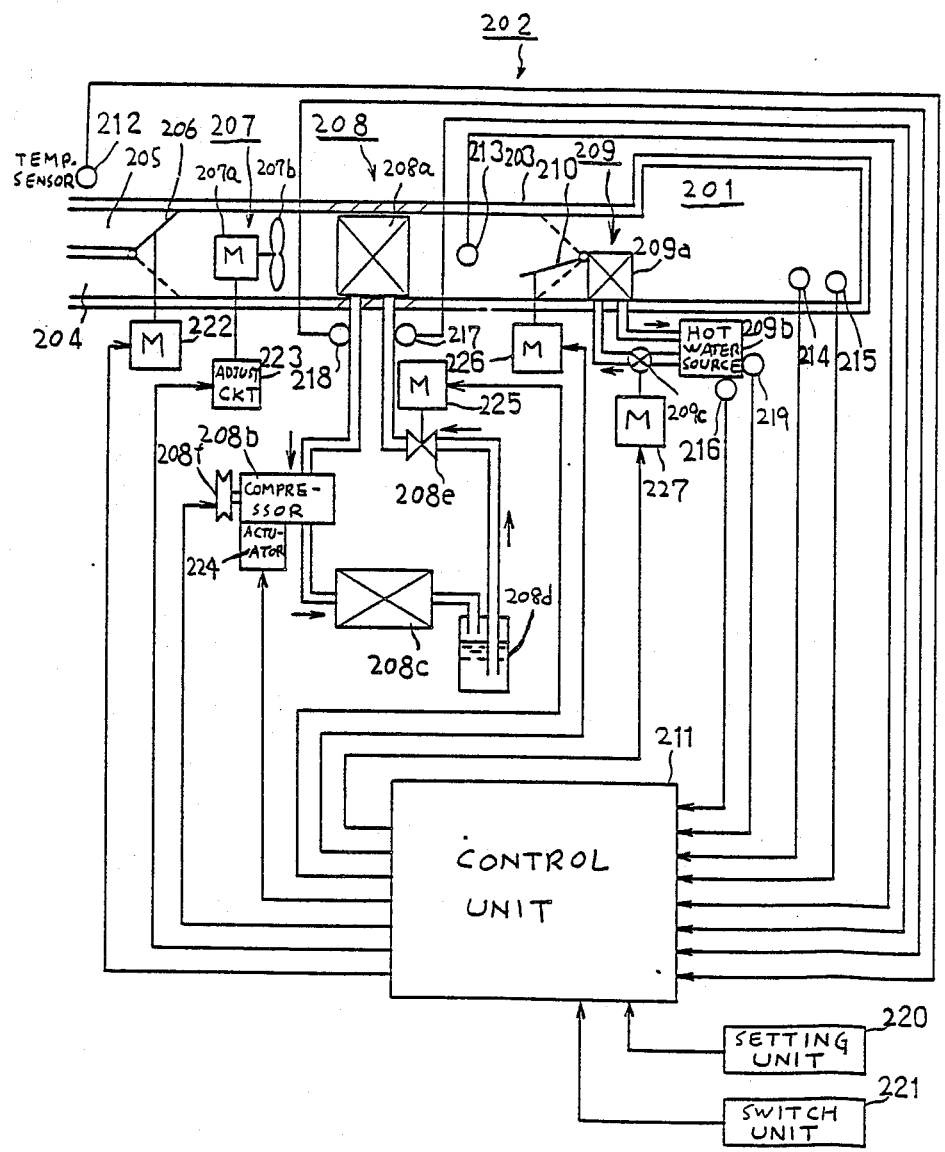
FIG. 10 is a diagram of an automotive air conditioner and a control apparatus according to a second embodiment of this invention.

With reference to FIG. 10, an automotive air conditioner 202 acting on an interior or passenger compartment 201 of a vehicle includes an air duct 203 having an outlet or downstream end opening into the vehicle interior 201. The duct 203 has first and second inlets or upstream ends 204 and 205 leading from the vehicle interior 201 and an exterior of the vehicle respectively. The first inlet 204 allows air to move from the vehicle interior 201 into the duct 203. The second inlet 205 allows air to move from the vehicle exterior into the duct 203. A damper 206 disposed within the duct 203 is movable between an inside air mode position and an outside air mode position shown by the solid line and the broken line respectively. When the damper 206 assumes the inside air mode position, the damper 206 unblocks the first inlet 204 but blocks the second inlet 205 so that air is allowed to move from the vehicle interior 201 into the duct 203 via the first inlet 204. When the damper 206 assumes the outside air mode position, the damper 206 unblocks the second inlet 205 but blocks the first inlet 204 so that air is allowed to move from the vehicle exterior into the duct 203 via the second inlet 205. A blower 207 composed of a combination of a motor 207a and a fan 207b is disposed within a region of the duct 203 downstream of the damper 206. The blower 207 serves to draw air into the duct 203 via the inlet 204 or 205 and to then drive the air toward the vehicle interior 201 along the duct 203.

A refrigeration cycle 208 includes an evaporator 208a, a compressor 208b of the variable capacity type, a condenser 208c, a receiver 208d, and an expansion valve 208e of the variable opening degree type. An electromagnetic clutch 208f selectively couples and uncouples a drive shaft of the compressor 208b to and from a mechanical power source such as an automotive engine. The evaporator 208a is disposed within a region of the duct 203 downstream of the blower 207. Refrigerant circulates through the refrigeration cycle 208 so that heats are exchanged between the air within the duct 203 and the refrigerant within the evaporator 208a of the refrigeration cycle 208.

High-temperature and high-pressure gas refrigerant derived via the compressor 208b is cooled and liquefied by the condenser 208c. During the liquefaction of the refrigerant, thermal energy moves from the refrigerant to environments of the condenser 208c. Then, the refrigerant moves from the condenser 208c to the expansion valve 208e by way of the receiver 208d. The refrigerant is atomized by the expansion valve 208e and is then vaporized by the evaporator 208a. The vaporization of the refrigerant cools the air surrounding the evaporator 208a. The vaporized refrigerant returns to the compressor 208b.

A heating unit 209 includes a heater core 209a, a hot water source 209b, and a water valve 209c. The heater core 209a is disposed within a region of the duct 203 downstream of the evaporator 208a. Hot water is supplied to the heater core 209a from the source 209b via the water valve 209c. The water valve 209c adjusts the rate of supply of hot water to the heater core 209a. The hot water heats air passing through the heater core 209a. After the heating process, the water returns from the heater core 209a to the source 209b. The hot water source 209b consists of an automotive engine, and engine coolant is used as hot water. An air mix damper 210 movably disposed within a region of the duct 203 between the evaporator 208a and the heater core 209a adjusts the ratio between the rate of air flow passing through the heater core 209a and the rate of air flow bypassing the heater core 209a, thereby controlling the temperature of air discharged into the vehicle interior 201. The ratio between the rate of air flow passing through the heater core 209a and the rate of air flow bypassing the heater core 209a depends on the position of the air mix damper 210.

A control unit 211 includes a microcomputer composed of a central processing unit (CPU), a read-only memory (ROM), a random-access memory (RAM), and an input and output (I/O) port connected via buses.

A sensor 212 disposed outside the vehicle interior 201 outputs a signal representing an atmospheric temperature. A sensor 213 disposed within the duct 203 outputs a signal representing a temperature of air at a point downstream of the evaporator 208a but upstream of the heater core 209a. This temperature is referred to as the evaporator downstream temperature. A sensor 214 disponsed within the vehicle interior 201 outputs a signal representing a temperature of air within the vehicle interior 201. A sensor 215 disposed within the vehicle interior 201 outputs a signal representing the intensity of sunshine. A sensor 216 provided to the hot water source 209b outputs a signal representing a temperature of hot water. A sensor 217 connected to the refrigeration cycle 208 outputs a signal representing a temperature of refrigerant at an inlet of the evaporator 208a. A sensor 218 connected to the refrigeration cycle 208 outputs a signal representing a temperature of refrigerant at an outlet of the evaporator 208a. A sensor 219 connected to the automotive engine outputs a signal representing a rotational speed of the engine. A manually controllable setting unit 220 outputs a signal representing an adjustable target temperature of the vehicle interior 201. A unit 221 including various manual switches outputs a signal designating whether the air conditioner 202 should be activated or deactivated, a signal designating a rate of air flow into the vehicle interior 201, a signal designating a position of the damper 206, and other signals. The output signals from the devices 212–221 are applied to the control unit 211.

A servo motor 222 drives the damper 206. The control unit 211 outputs a control signal to the servo motor 222 so that the damper 206 is controlled via the control signal. A circuit 223 adjusts the speed of the blower motor 207a. The control unit 211 outputs a control signal to the circuit 223 so that the speed of the blower motor 207a is controlled via the control signal. An actuator 224 drives a capacity varying mechanism of the compressor 208b. The control unit 211 outputs a control signal to the actuator 224 so that the capacity of the compressor 208b is controlled via the control signal. An actuator 225 such as a motor or a solenoid drives the expansion valve 208e. The control unit 211 outputs a control signal to the actuator 225 so that the degree of opening of the expansion valve 208e is controlled via the control signal. A servo motor 226 drives the air mix damper 210. The control unit 211 outputs a control signal to the servo motor 226 so that the position of the air mix damper 210 is controlled via the control signal. A servo motor 227 drives the water valve 209. The control unit 211 outputs a control signal to the servo motor 227 so that the water valve 209 is controlled via the control signal.

The air conditioner 202 and the control unit 211 will be described in more detail hereinafter.

A system for controlling the air conditioner 202 is formed as an integral-added optimal regulator adjusting the temperature TR of the vehicle interior 201, the air temperature TE at a point immediately downstream of the evaporator 208a, and the superheat SH of the refrigerant.

Figure 11:
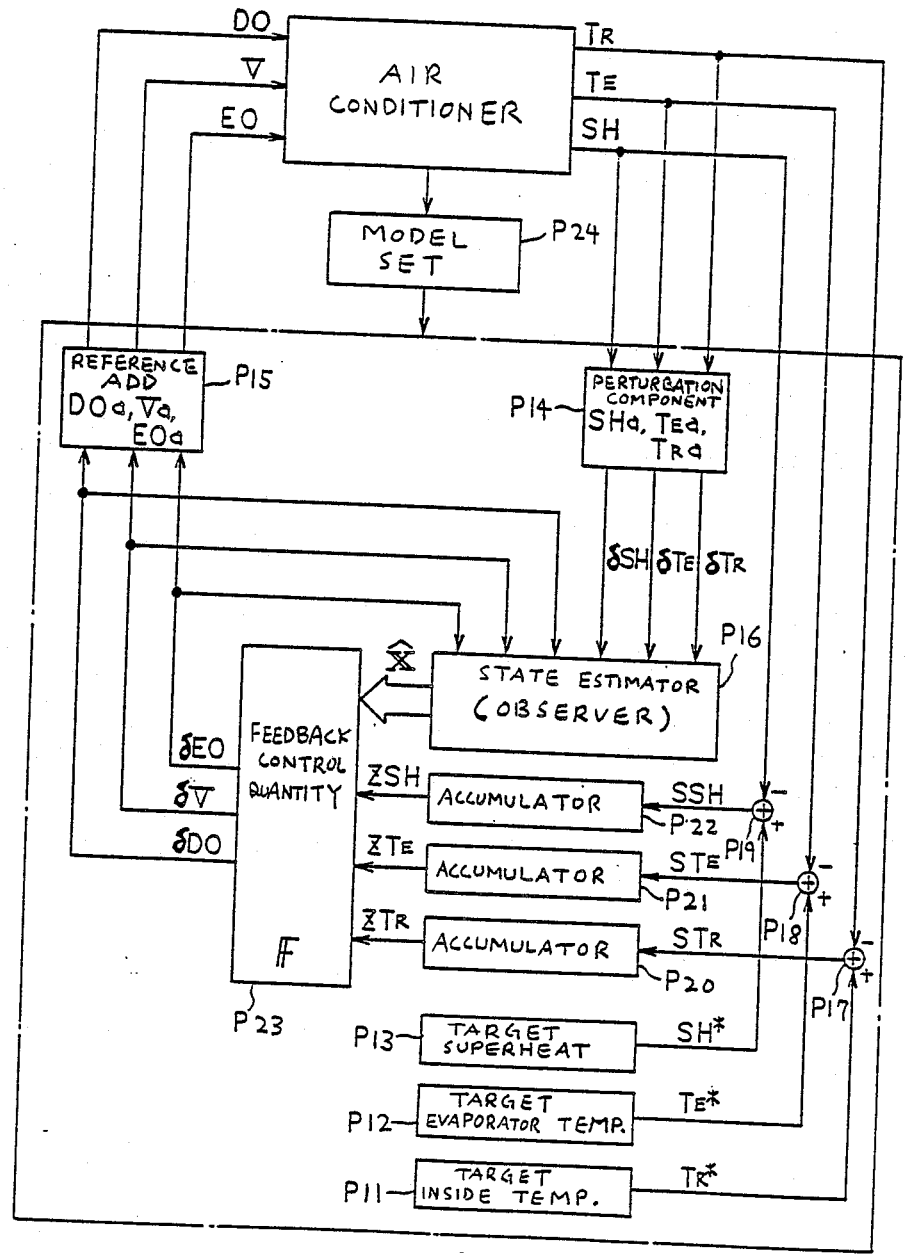
FIG. 11 is a diagram of the air conditioner and the control apparatus of FIG. 10.

As shown in FIG. 11, a section P11 outputs a target vehicle interior temperature TR* to an adder P17 of the integral-added optimal regulator. An actual vehicle interior temperature TR is fed to the adder P17. The adder P17 derives a difference STR between the actual and target vehicle interior temperatures TR and TR*, the difference STR being outputted to an accumulator P20. The section P20 accumulates the difference STR and thereby derives an accumulation value ZTR outputted to a section P23. A section P12 outputs a target evaporator downstream temperature TE* to an adder P18. An actual evaporator downstream temperature TE is fed to the adder P18. The adder P18 derives a difference STE between the actual and target evaporator downstream temperatures TE and TE*, the difference STE being outputted to an accumulator P21. The section P21 accumulates the difference STE and thereby derives an accumulation value ZTE outputted to the section P23. A section P13 outputs a target refrigerant superheat SH* to an adder P19. An actual refrigerant superheat SH is fed to the adder P19. The adder P19 deriyes a difference SSH between the actual and target superheats SH and SH*, the difference SSH being outputted to an accumulator P22. The section P22 accumulates the difference SSH and thereby derives an accumulation value ZSH outputted to the section P23.

The air conditioner 202 is a nonlinear system. A linear approximation is used in handling the behavior of the air conditioner 202 as described hereinafter. The total range of the variable state of the air conditioner 202 is divided into portions around respective steady points TRa, TEa, SHa, DOa, Va, and EOa where the air conditioner 202 can be approximately handled as being linear with respect to the steady points. Perturbation components $\delta TR$, $\delta TE$, $\delta SH$, $\delta DO$, $\delta V$, and $\delta EO$ measured from the respective steady points TRa, TEa, SHa, DOa, Va, and EOa are introduced in handling control quantities.

The actual vehicle interior temperature TR, the actual evaporator downstream temperature TE, and the actual superheat SH are fed to a section P14. The section P14 derives a perturbation component $\delta TR$ from the actual vehicle interior temperature TR and the related steady point value TRa. In addition, the section P14 derives a perturbation component $\delta TE$ from the actual evaporator downstream temperature TE and the related steady point value TEa. Furthermore, the section P14 derives a perturbation component $\delta SH$ from the actual superheat SH and the related steady point value SHa. The perturbation components $\delta TR$, $\delta TE$, and $\delta SH$ are outputted to a state estimator or an observer P16. Perturbation components $\delta DO$, $\delta V$, and $\delta EO$ are fed from the section P23 to the observer P16.

The observer P16 estimates state variables $\hat{X}$ on the basis of the received perturbation components. The state variables $\hat{X}$ represent the internal state of the air conditioner 202. The estimated state variables $\hat{X}$ are outputted to the section P23. The section P23 derives expanded state variables from the input state variables by use of the accumulation values ZTR, ZTE, and ZSH. The section P23 determines feedback controlled quantities of the position of the air mix damper 210, the capacity of the compressor 208b, and the degree of opening of the expansion valve 208e by multiplying the expanded state variables X by predetermined feedback gains F. The feedback controlled quantities consist of perturbation components δDO, δV, and ≠EO measured from respective steady points DOa, Va, and EOa. The feedback controlled quantities are outputted to a section P15 and the observer P16. The section P15 calculates a final or command controlled quantity DO of the air mix damper position which equals the sum of the steady point value DOa and the perturbation component δDO. In addition, the section P15 calculates a final or command controlled quantity V of the compressor capacity which equals the sum of the steady point value Va and the perturbation component δV. Furthermore, the section P15 calculates a final or command controlled quantity EO of the expansion valve opening degree which equals the sum of the steady point value EOa and the perturbation component δEO. The air conditioner 202 is controlled in accordance with the final controlled quantities DO, V, and EO. A model setting section P24 changes the feedback gains, the parameters used in the observer P16, and the steady point values in accordance with an operating condition of the air conditioner 202.

The integral-added optimal regulator was designed as follows.

(A) Modeling of Controlled System

The behavior of a controlled system including the air conditioner 202 is expressed by the following state and output equations.

$$X(k) = A \cdot X(k-1) + B \cdot u(k-1) \tag{31}$$

$$y(k) = C \cdot X(k) \tag{32}$$

where the character X(k) repersents state variables of the air conditioner 202; the character u(k) represents an input vector or control input quantities of the air conditioner 202, that is, the position DO of the air mix damper 210, the capacity V of the compressor 208b, and the opening degree EO of the expansion valve 208e; the character y(k) represents an output vector or control outputs of the air conditioner 202, that is, the air temperature TR of the vehicle interior 201, the evaporator downstream temperature TE, and the refrigerant superheat SH; and the character k represents the number of times of sampling.

Figure 12:
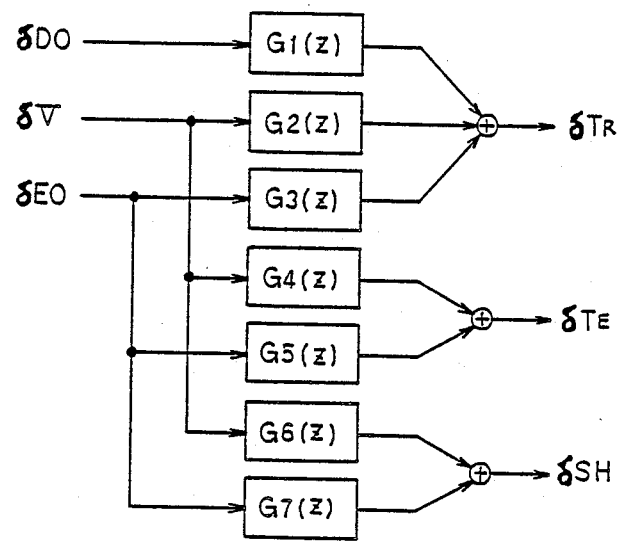
FIG. 12 is a block diagram of a 3-input 3-output system composed of the air conditioner of FIGS. 10 and 11.

FIG. 12 shows the air conditioner 202 as a 3-input 3-output system by use of transfer functions G1(z)-G7(z), where the character z represents z-transform of sampled values of the input and output signals. The transfer functions G1(z)-G7(z) have appropriate dimensions.

The system was identified by least squares method as follows.

Under preset steady operation states of the air conditioner 202, a suitable test signal producing one of perturbation components δDO, δV, and δEO but nullifying the others was applied to the air conditioner 202. During and after the application of the test signal, the input variation value and the resulting output variation values δTR, δTE, and δSH were sampled a preset number of times N. The data series {y(i)}, where i = 1, 2, 3, ..., N. In this case, the system is regarded as a one-input one-output system so that the transfer function G1(z) of the system is determined by the following equations.

$$G1(z) = B1(z^{-1})/A1(z^{-1}) \tag{33}$$

$$G1(z) = (b0 + b1 \cdot z^{-1} + \ldots + bn \cdot z^{-n})/(1 + a1 \cdot z^{-1} + a2 \cdot z^{-2} + \ldots + an \cdot z^{-n}) \tag{34}$$

where the character $z^{-1}$ denotes a unit delay or shift operator, and $z^{-1} \cdot X(k) = X(k-1)$.

The system transfer function G1(z) can be derived by determining the parameters a1 ... an and b0 ... bn of the equation (34) in accordance with the input and output data series {u(i)} and {y(i)}. In the system identification using least squares method, these parameters a1 ... an and b0 ... bn are determined or chosen so that the following summation J0 can be minimized.

$$J0 = \sum_{k=n}^{N} [(y(k) + a1 \cdot y(k-1) + \ldots + an \cdot y(k-n)) - \tag{35}$$

$$(b0 \cdot u(k) + b1 \cdot u(k-1) + \ldots + bn \cdot u(k-n))]^2$$

Figure 13:
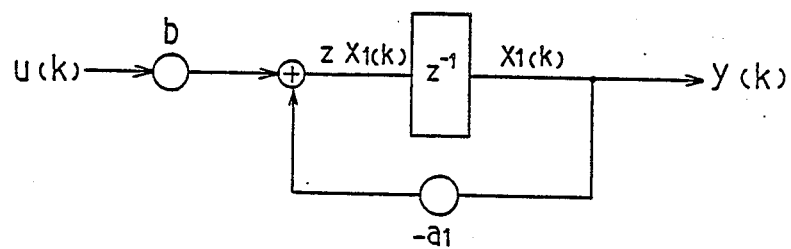
FIG. 13 is a signal flow diagram related to a transfer function used for a dynamic model of the air conditioner of FIGS. 10 and 11.

In this embodiment, the parameters were determined at the value n equal to 1. In this case, signal flow in the system has a manner as shown in FIG. 13, and the state variables are composed of [X1(k)] and the associated state and output equations are indicated below.

$$X1(k+1) = z \cdot X1(k) \tag{36}$$
$$= -a1 \cdot X1(k) + b1 \cdot u(k)$$

$$y(k) = X1(k) \tag{37}$$

Accordingly, in the case where the system is regarded as a one-input one-output system, system parameters A 1, B 1, and C 1 are given as follows.

$$\left.\begin{array}{rcl} A\,1 & = & -a1 \\ B\,1 & = & b1 \\ C\,1 & = & 1 \end{array}\right\} \tag{8}$$

In this way, the dynamic model of the system of this embodiment was determined through the system identification. The determination of the dynamic model relies on the fact that an operation state of the air conditioner 202 near a preset steady operation state can be expressed by linear approximation with respect to the preset steady operation state. Accordingly, in connection with each of a plurality of steady operation states, transfer functions G1(z)-G7(z) were determined in the previously-mentioned method so that vectors A, B, and C in the state equation (31) and the output equation (32) of a 3-input 3-output system were derived. In each of these dynamic models, the inputs and the outputs have fixed relationship in terms of perturbation quantities δ.

(B) Designing of Observer

The observer was designed as a full order observer. Designing of the observer was similar to the designing of the observer in the embodiment of FIGS. 1-9. As expressed in the equations (9)-(11) of the embodiment of FIGS. 1-9, the parameters A o, L, and B o were determined for respective models corresponding to steady operation states.

(C) Expansion of System Since the controlled object in this embodiment is of a servo type having variable target values TR*, TE*, and SH*, the system was expanded by use of accumulation values. Specifically, expanded state variables X (k) were introduced by combining the accumulation value vector "Z(k)=[ZTr(k) ZTE(k) ZSH(k)]$^T$" and the original state variables $\hat{X}$ (k) as expressed in the following equation.

$$X(k) = [\hat{X}(k)\ Z(k)]^T \quad (42)$$

(D) Calculation of Optimal Feedback Gains F

The expanded system determined in the section (C) is now expressed as follows.

$$\begin{bmatrix} \hat{X}(k) \\ Z(k) \end{bmatrix} = \begin{bmatrix} A & 0 \\ -C & 0 \end{bmatrix} \begin{bmatrix} \hat{X}(k-1) \\ Z(k-1) \end{bmatrix} + \quad (43)$$

$$\begin{bmatrix} B \\ 0 \end{bmatrix} u(k-1) + \begin{bmatrix} 0 \\ 1 \end{bmatrix} y^*(k-1)$$

$$*y(k) = [C\ 0] \begin{bmatrix} \hat{X}(k) \\ Z(k) \end{bmatrix} \quad (44)$$

When the dimension of the state variables $\hat{X}$ was 7, the following equations were derived.

X (k)=[$\hat{X}$1(k) $\hat{X}$2(k) $\hat{X}$3(k) $\hat{X}$4(k) $\hat{X}$5(k) $\hat{X}$6(k) X7(k)]$^T$ Z (k)=[ZTR(k) ZTE(k) ZSH(k)]$^T$ u (k)=[δDO(k) δV(k) δEO(k)]$^T$ y (k)=[δTR(k) δTE(k) δSH(k)]$^T$ y* (k)=[TR*(k) TE*(k) SH*(k)]$^T$ Control problem of the integral-added optimal regulator can be solved by determining optimal control inputs, that is, operating conditions u*(k), at which the performance index J corresponding to the performance index of the equation (15) in the embodiment of FIGS. 1–9 is minimized. The optimal control input u*(k) was thus given as expressed in the equations (16)–(18) of the embodiment of FIGS. 1–9.

The performance index J in this embodiment is intended to minimize the deviation from the condition state values y (k)=[δTR(k) δTE(k) δSH(k)]$^T$, constituting control outputs, while restricting movement of the operating zu condition values u (k)=[δDO(k) δV(k) δEO(k)]$^T$ constituting control inputs. The restriction on the operating condition values u (k) can be varied by changing the values in the weight matrices Q and R (see the equation (15)). Accordingly, the optimal feedback gains F were calculated by using the previously-determined dynamic models of the air conditioner 202, that is, the matrices A, B, and C; choosing the arbitrary weight parameter matrices Q and R; solving the Riccati equation and thus deriving the solution P (see the equation (18)); and finally referring to the feedback gain equation corresponding to the equation (17). The quantities u (k) of controlled inputs to the air conditioner 202 are calculated from the estimated state variables X (k) and the determined feedback gains F, and are specifically given as:

$$u(k) = F \cdot X(k) \quad (49)$$
$$= F \cdot [\hat{X}(k)\ Z(k)]^T$$

It should be noted that feedback gains F were determined for the respective dynamic models. In this embodiment, the parameters A o, B o, and L 1 (see the equation (10)) were determined as matrices having dimensions "7×7", "7×3", and "7×3" respectively. Furthermore, the feedback gains F were determined as a matrix having dimensions "3×10".

Modeling of the controlled system, designing of the observer, expansion of the system, and determination of the optimal feedback gains were performed beforehand on the basis of the formation of an integral-added optimal regulator (see FIG. 11). In the actual control of the air conditioner 202, the control unit 211 uses only the results of the previously-performed processes.

Figure 14:
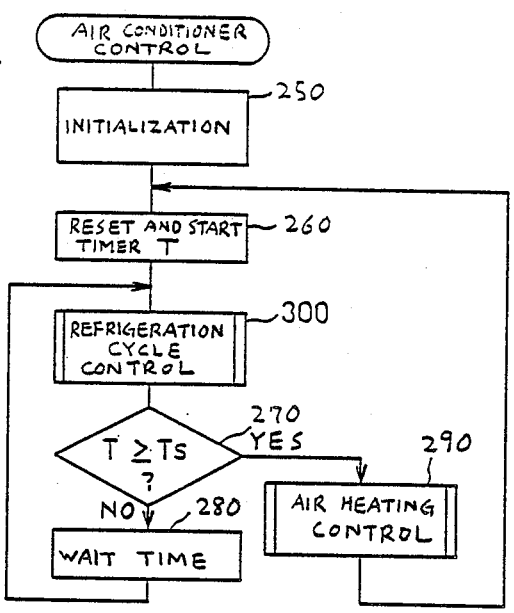
FIG. 14 is a flowchart of a program operating the control unit of FIG. 10.

The control unit 211 operates in accordance with a program stored in the internal ROM. FIG. 14 is a general flowchart of this program. In general, the response speed of control of the refrigeration cycle 208 is higher than the response speed of control of air temperature via a combination of the air mix damper 210 and the heating unit 9. Accordingly, the frequency of execution of the control of the refrigeration cycle 8 is set higher than the frequency of execution of the control related to the air heating section.

The control unit 211 starts to execute the program when the air conditioner 202 is turned on. As shown in FIG. 14, a first block 250 of the program initializes variables and sets initial values. After the block 250, the program advances to a block 260.

The block 260 resets and starts a timer. The variable T represents the time elapsed since the moment of the start of the timer. After the block 260, the program advances to a refrigeration cycle control block 300 which will be described in detail hereinafter.

A block 270 following the block 260 compares the elapsed time T with a preset time Ts. When the elapsed time T is shorter than the preset time Ts, the program returns to the block 300 by way of a block 280 which waits for a preset interval. When the elapsed time T is equal to or longer than the preset time Ts, the program advances to an air heating control block 290 which will be described in detail hereinafter. After the air heating control block 290, the program returns to the block 260.

Accordingly, the refrigeration cycle control block 300 is periodically reiterated until the elapsed time T reaches the preset time Ts. Each time the elapsed time T reaches the preset time Ts, the air heating control block 290 is executed and the elapsed time T is reset.

The preset interval given in the block 280 adjusts the periods of execution of the refrigeration cycle control block 300 and the air heating control block 290. The preset interval is preferably chosen so as to make the sampling period constant.

Figure 15:
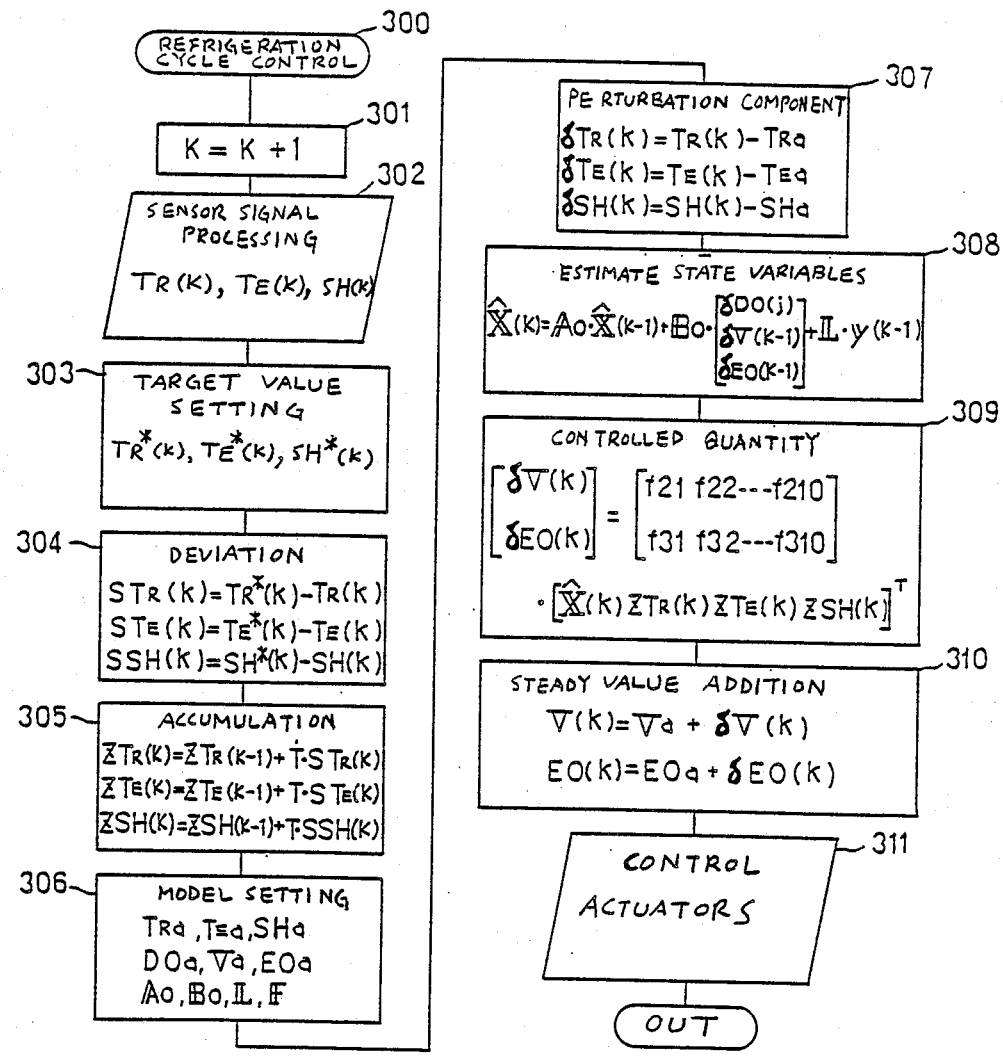

As shown in FIG. 15, a first step 301 of the refrigeration cycle control block 300 increments the sampling timing K by "1".

A step 302 following the step 301 inputs the output signals from the sensors 212–219, the temperature setting unit 200, and the switch unit 221 and derives the current sensed values and states represented by these output signals and including the actual vehicle interior temperature TR(k) and the actual evaporator downstream temperature TE(k). In addition, the refrigerant superheat SH(k) is derived on the basis of the difference between the refrigerant temperatures detected by the sensors 217 and 218.

A step 303 following the step 302 calculates a target vehicle interior temperature TR*(k), a target evaporator downstream temperature TE*(k), and a target refrigerant superheat SH*(k). Specifically, the target evaporator downstream temperature TE*(k) is determined in accordance with the target vehicle interior temperature, the inside air temperature, the atmospheric air temperature, the coolant temperature, and with whether or not dehumidification is required. The process in the step 303 corresponds to the target value setting sections P11-P13 of FIG. 11.

A step 304 following the step 303 calculates a deviation or difference STR(k) between the target and actual vehicle interior temperatures TR*(k) and TR(k), a deviation or difference STE(k) between the target and actual evaporator downstream temperatures TE*(k) and TE(k), and a deviation or difference SSH(k) between the target and actual refrigerant superheats SH*(k) and SH(k). The process in the step 304 corresponds to the adders P17-P19 of FIG. 11.

A step 305 following the step 304 accumulates the deviations STR(k), STE(k), and SSH(k), and thus derives accumulated deviations ZTR(k), ZTE(k), and ZSH(k) by referring to the following equations or statements.

$$ZTR(k)=ZTR(k-1)+T \cdot STR(k)$$

$$ZTE(k)=ZTE(k-1)+T \: STE(k)$$

$$ZSH(k)=ZSH(k-1)+T \cdot SSH(k,$$

where the letter T denotes a sampling period. The process in the step 305 corresponds to the accumulation sections P20-P22 of FIG. 11.

As described previously, a plurality of steady operation states were determined during the construction of the dynamic models of the air conditioner 202. The predetermined steady operation states form base points within respective divided ranges where linear approximations with respect to the base points are regarded as being accurate.

A step 306 following the step 305 selects one of the predetermined steady operation states which is closest to the current state determined in accordance with the various input values and states derived in the step 302. In addition, the step 306 selects the steady point value TRa of the vehicle interior temperature, the steady point value TEa of the evaporator downstream temperature, the steady point value SHa of the refrigerant superheat, the steady point value DOa of the air mix damper position, the steady point value Va of the compressor capacity, the steady point value EOa of the expansion valve opening degree, the feedback gains F, and the parameters A o, B o, and L corresponding to the selected steady state. The process in the step 306 corresponds to the model setting section P24 of FIG. 11.

A step 307 following the step 306 derives a perturbation component δTR(k) of the vehicle interior temperature TR(k) measured from the steady point TRa, a perturbation component δTE(k) of the evaporator downstream temperature TE(k) measured from the steady point TEa, and a perturbation component δSH(k) of the refrigerant superheat SH(k) measured from the steady point SHa. The process in the step 307 corresponds to the perturbation component deriving section P14 of FIG. 11.

A step 308 following the step 307 estimates state variables $\hat{X}$ (k) from the predetermined parameters A o, B o, and L selected in the step 306, the perturbation T components $[\delta TR(k-1) \: \delta TE(k-11) \: \delta SH(k-1)]^T$ calculated in the step 307 during the preceding execution cycle of the program, the state variables $\hat{X}$ (k−1) estimated in the preceding execution cycle of the program, and the control input perturbation components $[\delta DO(j) \: \delta V(k-1) \: \delta EO(k-1)]^T$. Specifically, the state variables $\hat{X}$ (k) are estimated by referring to the equation (41). It should be noted that the perturbation components δV(k−1) and δEO(k−1) are determined during the preceding execution cycle of the program while the perturbation component δDO(j) is determined in the last execution of the air heating control block 290. The process in the step 308 corresponds to the state estimator P16 of FIG. 11.

A step 309 following the step 308 determines controlled quantities, that is, the perturbation component δV(k) of the compressor capacity and the perturbation component δEO(k) of the expansion valve opening degree, in accordance with the state variables $\hat{X}$ (k) and the accumulated deviations Z (k) given in the steps 308 and 305 respectively, and with the feedback gains F. Specifically, the controlled quantities are determined by referring to the equation (49). The process in the step 309 corresponds to part of the feedback control quantity determination section P23 of FIG. 11.

A step 310 following the step 309 determines a command or target capacity V(k) of the compressor 208b in accordance with the compressor capacity perturbation component δV(k) and the steady point value Va given in the steps 309 and 306 respectively. In addition, the step 310 determines a command or target opening degree EO(k) of the expansion valve 208e in accordance with the opening degree perturbation component δEO(k) and the steady point value EOa given in the steps 309 and 306 respectively. The process in the step 310 corresponds to part of the reference value addition section P15 of FIG. 11.

After the step 310, the program advances to a final step 311 of the refrigeration cycle control block 300. The step 311 controls the compressor adjustment actuator 221 in accordance with the target compressor capacity V(k) so that the actual compressor capacity will be equal to the target compressor capacity V(k) given in the step 310. In addition, the step 311 controls the expansion valve drive actuator 225 in accordance with the target opening degree EO(k) so that the actual opening degree of the expansion valve 208e will be equal to the target opening degree EO(k) given in the step 310

Figure 16:
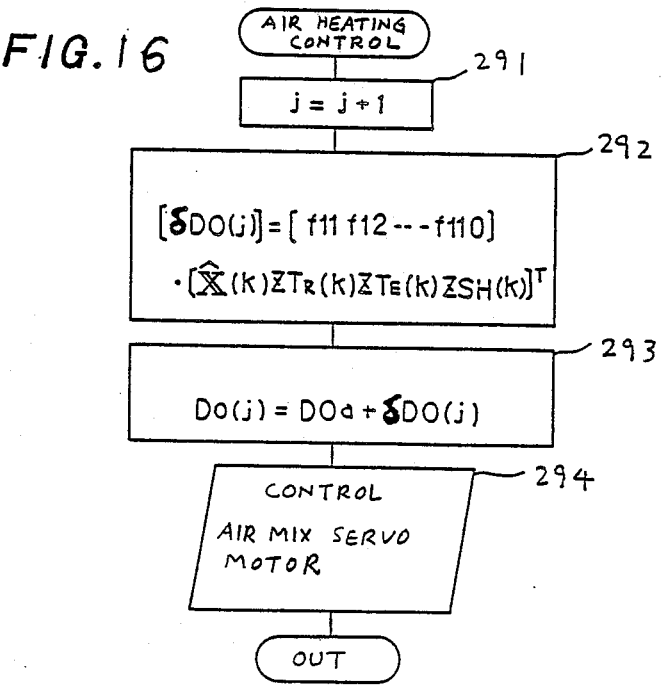
FIGS. 15 and 16 are diagrams of internal designs of the blocks in the FIG. 14.

As shown in FIG. 16, a first step 291 of the air heating control block 290 increments the sampling timing by "1".

A step 292 following the step 291 determines the perturbation component δDO(j) of the air mix damper position in accordance with the estimated state variables $\hat{X}$ (k) and the accumulated deviation Z (k) given in the steps 308 and 305 of FIG. 15 respectively. Specifically, the damper perturbation component δDO(j) is calculated by referring to the equation (49). The process in the step 292 corresponds to another part of the feedback control quantity calculation section P23.

A step 293 calculates a command or target controlled quantity DO(j) of the air mix damper position which equals the sum of the perturbation component δDO(j) and the steady point value DOa given in the steps 292 and 306 (see FIG. 5). The process in the step 293 corresponds to another part of the steady value addition section P15.

After the step 293, the program advances to a final step 294 of the air heating control block 290. The step 294 controls the air mix damper drive motor 226 in accordance with the target position DO(j) so that the actual position of the air mix damper 210 will be equal to the target position DO(j) given in the step 293.

This embodiment has advantages similar to the advantages of the embodiment of FIGS. 1-9. Furthermore, in this embodiment, the superheat of the refrigerant of the refrigeration cycle 208 is controlled. The control of the refrigerant superheat allows efficient operation of the refrigeration cycle 208. In addition, the differentiated frequencies of execution of the refrigeration cycle control block 300 and the air heating control block 290 ensure excellent response characteristics of the air conditioner 202.

DESCRIPTION OF THE THIRD PREFERRED EMBODIMENT

A third embodiment is similar to the embodiment of FIGS. 10-16 except for design changes indicated hereinafter.

In the third embodiment, a system for controlling the refrigeration cycle 208 is formed as an integral-added optimal regulator which adjusts the air temperature TE at a point immediately downstream of the evaporator 208a and the superheat SH of the refrigerant in accordance with the capacity V of the compressor 208b and the degree of opening of the expansion valve 208e. In addition, the compressor capacity V and the expansion valve opening degree EO are corrected in accordance with the engine speed N via feedforward control.

Figure 17:
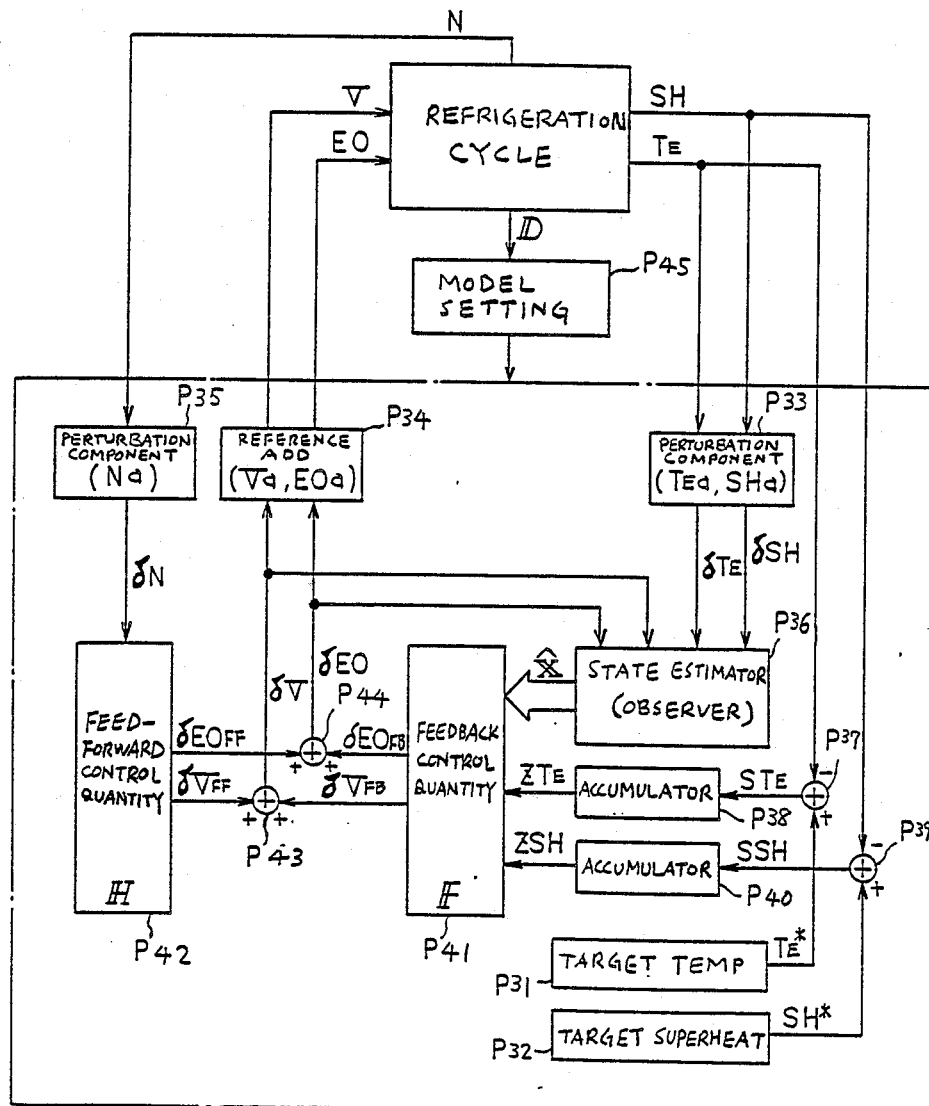
FIG. 17 is a diagram of a refrigeration cycle and a control apparatus according to a third embodiment of this invention.

As shown in FIG. 17, a section P31 outputs a target evaporator downstream temperature TE* to an adder P37 of the integral-added optimal regulator. An actual evaporator downstream temperature TE is fed to the adder P37. The adder P37 derives a difference STE between the actual and target evaporator downstream temperatures TE and TE*, the difference STE being outputted to an accumulator P38. The section P38 accumulates the difference STE and thereby derives an accumulation value ZTE outputted to a section P41. A section P32 outputs a target refrigerant superheat SH* to an adder P39. An actual refrigerant superheat SH is fed to the adder P39. The adder P39 derives a difference SSH between the actual and target superheats SH and SH*, the difference SSH being outputted to an accumulator P40. The section P40 accumulates the difference SSH and thereby derives an accumulation value ZSH outputted to the section P41.

The refrigeration cycle 208 is a nonlinear system. A linear approximation is used in handling the behavior of the refrigeration cycle 208 as described hereinafter. The total range of the state if the refrigeration cycle 208 is divided into portions around respective steady points TEa, SHa, EOa, Va, and Na where the refrigeration cycle 208 can be approximately handled as being linear with respect to the steady points. Perturbation components $\delta$TE, $\delta$SH, $\delta$EO, $\delta$V, and $\delta$N measured from the respective steady points TEa, SHa, EOa, Va, add Na are introduced in handling control quantities. This linear approximation means the construction of dynamic models corresponding to the respective divided portions of the range.

The actual evaporator downstream temperature TE and the actual superheat SH are fed to a section P33. The section P33 derives a perturbation component $\delta$TE from the actual evaporator downstream temperature TE and the related steady point value TEa. Furthermore, the section P33 derives a perturbation component $\delta$SH from the actual superheat SH and the related steady point value SHa. The perturbation components $\delta$TE and $\delta$SH are outputted to a state estimator or an observer P36. Perturbation components $\delta$V and $\delta$EO are fed from adders P43 and P44 to the observer P36.

The observer P36 estimates state variables $\hat{X}$ on the basis of the received perturbation components. The state variables $\hat{X}$ represent the internal state of the refrigeration cycle 208. The estimated state variables $\hat{X}$ are outputted to the section P41. The section P41 derives expanded state variables from the input state variables by use of the accumulation values ZTE and ZSH. The section P41 determines feedback controlled quantities $\delta$VFB and $\delta$EOFB of the capacity of the compressor 208b and the degree of opening of the expansion valve 208e by multiplying the expanded state variables $\hat{X}$ by predetermined feedback gains F. The feedback controlled quantities $\delta$VFB and $\delta$EOFB are outputted to the adders P43 and P44 respectively.

The engine speed N is fed to a section P35, which derives a perturbation component $\delta$N from the engine speed N and the related steady point value Na. The pertubation component $\delta$N is fed to a section P42. The section P42 determines feedforward controlled quantities $\delta$VFF and $\delta$EOFF of the capacity of the compressor 208b and the degree of opening of the expansion valve 208e by multiplying the perburbation component $\delta$N by predetermined feedforward gains H. The feedforward controlled quantities $\delta$VFF and $\delta$EOFF are outputted to the adders P43 and P44 respectively.

The adder P43 calculates a controlled quantity $\delta$V of the compressor capacity which equals the sum of the feedback and feedforward controlled quantities $\delta$VFB and $\delta$VFF. The controlled quantity $\delta$V corresponds to a perturbation component measured from the related steady point Va. The adder P44 calculates a controlled quantity $\delta$EO of the expansion valve opening degree which equals the sum of the feedback and feedforward controlled quantities $\delta$EOFB and $\delta$EOFF. The controlled quantity $\delta$EO corresponds to a perturbation component measured from the related steady point EOa. The controlled quantities $\delta$V and $\delta$EO are outputted to a section P34. The section P34 calculates a final or command controlled quantity V of the compressor capacity which equals the sum of the steady point value Va and the perturbation component $\delta$V. In addition, the section P34 calculates a final or command controlled quantity EO of the expansion valve opening degree which equals the sum of the steady point value EOa and the perturbation component $\delta$EO. The refrigeration cycle 208 is controlled in accordance with the final controlled quantities V and EO.

A model setting section P45 changes the dynamic model of the control system in accordance with variables D representing operating conditions of the refrigeration cycle 208. The change of the dynamic model is performed when the state of the refrigeration cycle 208 moves from one divided portion to another divided portion of the total range. Specifically, the rate of air flow through the duct 203, the atmospheric temperature, the rate of air flow through the condenser 208c, and others are used as the operating condition variables D. The section P45 changes the values related to the dynamic model, that is, the steady point values TEa, SHa, Va, EOa, and Na, observer parameters, the feedback gains F, and the feedforward gains H.

The integral-added optimal regulator was designed as follows (A) Modeling of Controlled System The behavior of a controlled system, that is, the refrigeration cycle 208, is expressed by the following state and output equations.

$$X(k) = A \cdot X(k-1) + B \cdot u(k-1) + E \cdot d(k) \qquad (51)$$

$$y(k) = C \cdot X(k) \qquad (52)$$

where the character X (k) repersents state variables of the refrigeration cycle 208; the character u (k) represents an input vector or control inputs of the refrigeration cycle 208, that is, the capacity V of the compressor 208b and the opening degree EO of the expansion valve 208e; the character y (k) represents an output vector or control outputs of the refrigeration cycle 208, that is, the evaporator downstream temperature TE and the refrigerant superheat SH; the character $d$ (k) represents a disturbance, that is, the engine speed or the compressor speed N; and the character k represents the number of times of sampling.

Figure 18:
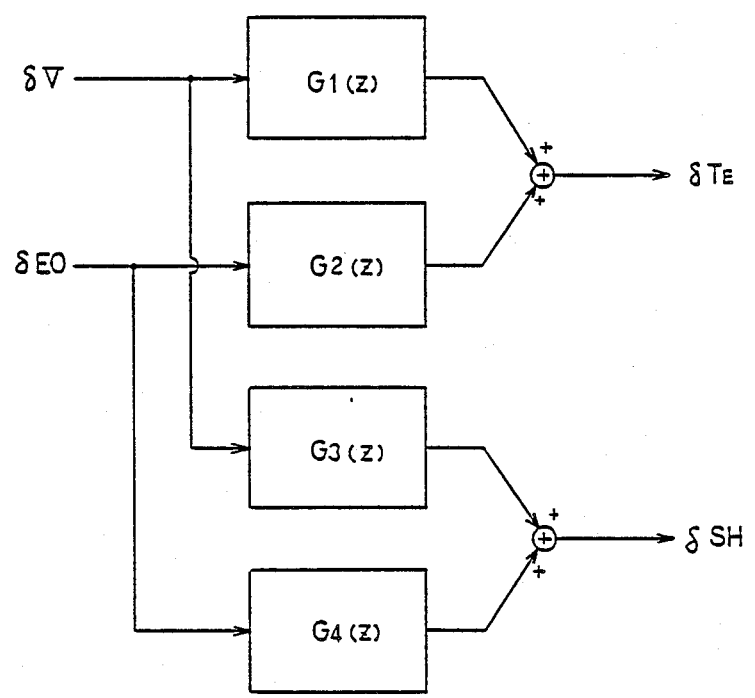
FIG. 18 is a block diagram of a 2-input 2-output system composed of the refrigeration cycle of FIG. 17.

FIG. 18 shows the refrigeration cycle 208 as a 2-input 2-output system by use of transfer functions G1(z)-G4(z), where the character z represents z-transform of sampled values of the input and output signals. The transfer functions G1(z)-G4(z) have appropriate dimensions. It should be noted that a term of disturbance is omitted from the system of FIG. 18.

The system was identified by least squares method as follows.

Under preset steady operation states of the refrigeration cycle 208, a suitable test signal producing one of perturbation components $\delta V$ and $\delta EO$ but nullifying the other was applied to the refrigeration cycle 208. During and after the application of the test signal, the input variation value and the resulting output variation values $\delta TE$ and $\delta SH$ were sampled a preset number of times N. The sampled values form input data series $\{u(i)\}$ and output data series $\{y(i)\}$, where $i = 1, 2, 3, \ldots, N$. In this case, the system is regarded as a one-input one-output system so that, for example, the transfer function G1(z) of the system was determined by the following equations.

$$G1(z) = B1(z^{-1})/A1(z^{-1}) \qquad (53)$$

$$G1(z) = (b0 + b1 \cdot z^{-1} + \ldots + bn \cdot z^{-n})/(1 + a1 \cdot z^{-1} + a2 \cdot z^{-2} + \ldots + an \cdot z^{-n}) \qquad (54)$$

where the character $z^{-1}$ denotes a unit delay or shift operator, and $z^{-1} \cdot X(k) = X(k-1)$.

The system transfer function G1(z) can be derived by determining the parameters a1 ... an and b0 ... bn of the equation (54) in accordance with the input and output data series $\{u(i)\}$ and $\{y(i)\}$. In the system identification using least squares method, these parameters a1 ... an and b0 ... bn are determined or chosen so that the following summation J0 can be minimized.

$$J0 = \sum_{k=n}^{N} [(y(k) + a1 \cdot y(k-1) + \ldots + an \cdot y(k-n)) - (b0 \cdot u(k) + b1 \cdot u(k-1) + \ldots + bn \cdot u(k-n))]^2 \qquad (55)$$

In this embodiment, the parameters were determined at the value n equal to 1. In this case, signal flow in the controlled system has a manner as shown in FIG. 13, and the state variables are composed of [X1(k)] and the associated state and output equations are indicated below.

$$\begin{aligned} X1(k+1) &= z \cdot X1(k) \\ &= -a1 \cdot X1(k) + b1 \cdot u(k) \end{aligned} \qquad (56)$$

$$y(k) = X1(k) \qquad (57)$$

Accordingly, in the case where the controlled system is regarded as a one-input one-output system, system parameters A 1, B 1, and C 1 are given as follows.

$$\begin{aligned} A\,1 &= -a1 \\ B\,1 &= b1 \\ C\,1 &= 1 \end{aligned} \qquad (58)$$

The system parameters were determined for the respective transfer functions G1(z)-G4(z) in the previously-mentioned way. The parameters A, B, and C in the state and output equations (51) and (52) for the 2-input 2-output system were derived from the determined system parameters for the one-input one-output system.

The parameter E of the disturbance term of the state equation (51) was determined as follows. Under steady operating conditions of the refrigeration cycle 208, an impulse which would vary the compressor speed N was applied to the refrigeration cycle 208. During and after the application of the impulse, values of the control outputs y (k) responsive to the resulting variation in the compressor speed N were sampled. The parameter E was determined in accordance with the sampled values of the control outputs y (k).

In this way, the dynamic models of the controlled system of this embodiment were determined through the system identification. The determination of the dynamic models relies on the fact that an operation state of the refrigeration cycle 208 near a preset steady operation state can be expressed by linear approximation with respect to the preset steady operation state. Accordingly, in connection with each of a plurality of steady operation states, transfer functions G1(z)-G4(z) were determined in the previously-mentioned method, and vectors A, B, C, and E in the state equation (51) and the output equation (52) of a 3-input 3-output system were derived. In each of these dynamic models, the inputs and the outputs have fixed relationship in terms of perturbation quantities $\delta$.

(B) Designing of Observer

The observer was designed as a full order observer. Designing of the observer was similar to the designing of the observer in the embodiment of FIGS. 1-9. It should be of the observer. As expressed in the equations (9)-(11) of the embodiment of FIGS. 1-9 the parameters A o, L, and B o were determined for respective models corresponding to steady operation states.

(C) Expansion of System

Since the controlled object in this embodiment is of a servo type having a variable target evaporator downstream temperature TE* and a variable target refrigerant superheat SH*, the system was expanded by use of accumulation values. Specifically, expanded state variables X (k) were introduced by combining the accumulation value vector "Z (k) = [ZTE(k) ZSH(k)]$^T$" and the original state variables X̂ (k) as expressed in the following equation.

$$X(k) = [\hat{X}(k) \ ZTE(k) \ ZSH(k)]^T \quad (62)$$

(D) Calculation of Optimal Feedback Gains F

The expanded system determined in the section (C) is now expressed as follows.

$$\begin{bmatrix} \hat{X}(k) \\ Z(k) \end{bmatrix} = \begin{bmatrix} A & 0 \\ -C & 0 \end{bmatrix} \begin{bmatrix} \hat{X}(k-1) \\ Z(k-1) \end{bmatrix} + \begin{bmatrix} B \\ 0 \end{bmatrix} u(k-1) + \begin{bmatrix} 0 \\ 1 \end{bmatrix} y^*(k-1) \quad (63)$$

$$y(k) = [C \ 0] \begin{bmatrix} \hat{X}(k) \\ Z(k) \end{bmatrix} \quad (64)$$

When the dimension of the state variables $\hat{X}(k)$ was 4, the following equations were derived.

$$\hat{X}(k) = [\hat{X}_1(k) \ \hat{X}_2(k) \ \hat{X}_3(k) \ \hat{X}_4(k)]^T$$

$$Z(k) = [ZTE(k) \ ZSH(k)]^T$$

$$u(k) = [\delta V(k) \ \delta EO(k)]^T$$

$$y(k) = [\delta TE(k) \ \delta SH(k)]^T$$

$$y^*(k) = [TE^*(k) \ SH^*(k)]^T$$

Control problem of the integral-added optimal regulator can be solved by determining optimal control inputs, that is, operating conditions $u^*(k)$, at which the performance index J corresponding to the performance index of the equation (15) in the embodiment of FIGS. 1-9 is minimized. The optimal control input $u^*(k)$ was thus given as expressed in the equations (16)–(18) of the embodiment of FIGS. 1-9.

The performance index J in this embodiment is intended to minimize the deviation from the operation state values $y(k) = [\delta TE(k) \ \delta SH(k)]^T$, constituting control condition values $u(k) = [\delta V(k) \ \delta EO(k)]^T$ constituting control inputs. The restriction on the operating condition values $u(k)$ can be varied by changing the values in the weight matrices Q and R (see the equation (15)). Accordingly, the optimal feedback gains F were calculated by using the previously-determined dynamic models of the refrigeration cycle 208, that is, the matrices A, B, and C; choosing the arbitrary weight parameter matrices Q and R; solving the Riccati equation and thus deriving the solution P (see the equation (18)); and finally referring to the feedback gain equation corresponding to the equation (17). The quantities $u(k)$ of controlled inputs to the refrigeration cycle 208 are calculated from the estimated state variables $X(k)$ and the determined feedback gains F, and are specifically given as:

$$u(k) = F \cdot X(k) \quad (69)$$
$$= F \cdot [\hat{X}(k) \ Z(k)]^T$$

It should be noted that the feedback gains F were determined for the respective dynamic models.

(E) Calculation of Feedforward Gains H

Control input $u(k)$ is now expressed as:

$$u(k) = F \cdot X + H \cdot d(k) \quad (70)$$

In the case of optimal regulator control, the minimal value of the performance index J is given as:

$$\min J = X(0)^T \cdot P \cdot X(0) \quad (71)$$

It is now assumed that the refrigeration cycle 208 is subjected to a step disturbance, and specifically an abrupt change of the engine speed. The final values of the state variables $X(k)$ are given as $X(\infty)$. When the equilibrium point is moved, a problem of a step response becomes equivalent to a problem with an initial value equal to $-X(\infty)$. In this case, the minimal value of the performance index J is given as:

$$\min J = X(\infty)^T \cdot P \cdot X(\infty) \quad (72)$$

Since the the values $X(\infty)$ depend on the feedforward gains H, the feedforward gains H are determined so that the index of the equation (72) will be minimized. The equations (51), (52), and (70) are transformed, provided that $X(0) = 0$ and $X(k) \to X(\infty)$. The combination of the equations (70) and (72) results in the following equation.

$$A \cdot X(\infty) + B \cdot (F \cdot X(\infty) + H \cdot d) + E \cdot d = 0$$

This equation is transformed into the equation as follows.

$$X(\infty) = (A + B \cdot F)^{-1} \cdot (B \cdot H + E) \cdot d \quad (73)$$

Since the optimal feedback gains F were already calculated, the matrix "A+B·F" is nonsingular. In addition, the matrix P is positive definite. Since respective columns of the vector or matrix B are mutually independent, the feedforward gains H, which will minimize the index of the equation (72) with respect to an arbitrary step disturbance, are determined as follows.

The combination of the equations (72) and (73) results in the following equation.

$$\min J = (M + W + H)^T \cdot P \ (M \cdot W \cdot H) \cdot d^2 \quad (74)$$

where the values M and W are given as:

$$M \triangleq -(A + B \cdot F)^{-1} \cdot E$$

$$W \triangleq -(A + B \cdot F)^{-1} \cdot B$$

When the equation (74) is partially differentiated with respect to the feedforward gains H, the following equation is derived.

$$\delta \min J / \delta H = 2(W^T \cdot P \cdot M + W^T \cdot P \cdot W \cdot H) Q^2$$

The value given by this equation is null since the disturbance d is a scalar. It should be noted that the disturbance d consists of a change in the compressor speed which is proportional to the engine speed. Accordingly, the feedforward gains H are given as:

$$H = -(W^T \cdot P \cdot W)^{-1} \cdot W^T \cdot P \cdot M \quad (75)$$

Since the feedback gains F, the vectors or matrices A, B, C, and E were already determined, the feedforward gains $H = [H1 \ H2]^T$ were easily calculated by referring to the equation (75).

Modeling of the controlled system, designing of the observer, expansion of the system, determination of the optimal feedback gains, and determination of the feedforward gains were performed beforehand on the basis of the formation of an integral-added optimal regulator (see FIG. 17). In the actual control of the refrigeration cycle 208, the control unit 211 uses only the results of the previously-performed processes.

Figure 19:
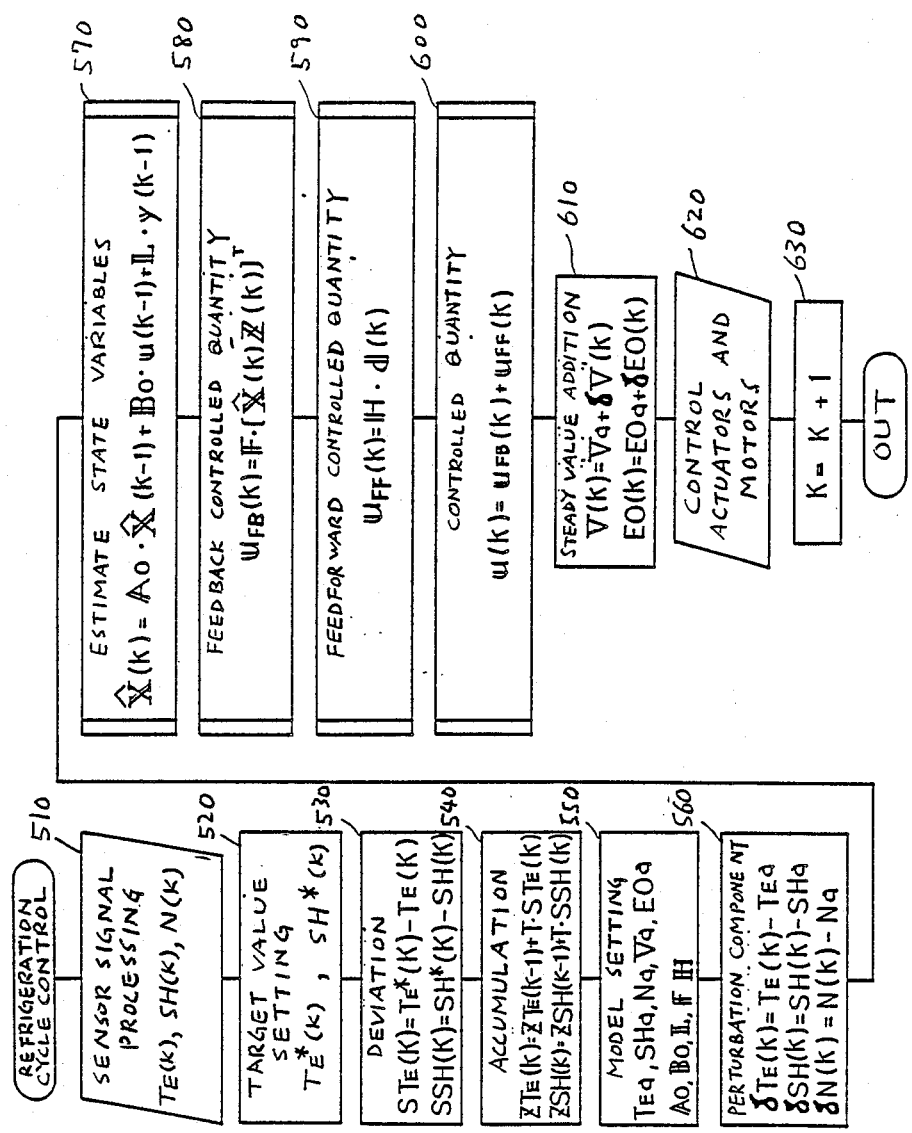
FIG. 19 is a flowchart of a program operating a control unit of the third embodiment.

The control unit 211 operates in accordance with a program stored in the internal ROM. FIG. 19 is a flowchart of a refrigeration cycle control section of this program. The refrigeration cycle control section of the program is reiterated periodically at essentially regular intervals. In the flowchart of FIG. 19, each adscript (k) represents that the associated value is determined in the current execution cycle of the program while each adscript (k−1) represents that the associated value is determined in the preceding execution cycle of the program.

The control unit 211 starts to execute the program when the air conditioner 202 is turned on. As shown in FIG. 19, a first step 510 of the refrigeration cycle control section of the program inputs the output signals from the sensors 212–219, the temperature setting unit 200, and the switch unit 221 and derives the current sensed values and states represented by these output signals and including the actual evaporator downstream temperature TE(k). In addition, the refrigerant superheat SH(k) is derived on the basis of the difference between the refrigerant temperatures detected by the sensors 217 and 218. Furthermore, the compressor speed N(k) is calculated from the engine speed detected by the sensor 219.

A step 520 following the step 510 calculates a target evaporator downstream temperature TE*(k) and a target refrigerant superheat SH*(k). Specifically, the target evaporator downstream temperature TE*(k) is determined in accordance with the target vehicle interior temperature, the inside air temperature, the atmospheric air temperature, the coolant temperature, and with whether or not dehumidification is required. The target refrigerant superheat is set to a small value such that liquid back can be prevented. The process in the step 520 corresponds to the target value setting sections P31 and P32 of FIG. 17.

A step 530 following the step 520 calculates a deviation or difference STE(k) between the target and actual evaporator downstream temperatures TE*(k) and TE(k), and a deviation or difference SSH(k) between the target and actual refrigerant superheats SH*(k) and SH(k). The process in the step 530 corresponds to the adders P37 and P30 of FIG. 17.

A step 540 following the step 530 accumulates the deviations STE(k) and SSH(k), and thus derives accumulated deviations ZTE(k) and ZSH(k) by referring to the following equations or statements.

ZTE(k)=ZTE(k−1)+T·STE(k)

ZSH(k)=ZSH(k−1)+T·SSH(k)

where the letter T denotes a sampling period. The process in the step 540 corresponds to the accumulation sections P38 and P40 of FIG. 17.

As described previously, a plurality of steady operation states were determined during the construction of the dynamic models of the refrigeration cycle 208. The predetermined steady operation states form base points within respective divided ranges where linear approximations with respect to the base points are regarded as being accurate.

A step 550 following the step 540 selects one of the predetermined steady operation states which is closest to the current state determined in accordance with the various input values and states derived in the step 510. In addition, the step 550 selects the steady point value TEa of the evaporator downstream temperature, the steady point value SHa of the refrigerant superheat, the steady point value Na of the compressor speed, the steady point value Va of the compressor capacity, the steady point value EOa of the expansion valve opening degree, the feedback gains F, the feedforward gains H, and the parameters A o, B o, and L corresponding to the selected steady state. The process in the step 550 corresponds to the model setting section P45 of FIG. 17.

A step 560 following the step 550 derives a perturbation component $\delta TE(k)$ of the evaporator downstream temperature TE(k) measured from the steady point TEa, a perturbation component $\delta SH(k)$ of the refrigerant superheat SH(k) measured from the steady point SHa, and a perturbation component $\delta N(k)$ of the compressor speed N(k) measured from the steady point Na. The process in the step 560 corresponds to the perturbation component deriving sections P33 and P35 of FIG. 17.

A step 570 following the step 560 estimates state variables $\hat{X}(k)$ from the predetermined parameters A o, B o, and L selected in the step 550, the control outputs y (k−1) equal to the perturbation components calculated in the step 560 during the preceding execution cycle of the program, the state variable $\hat{X}(k-1)$ estimated in the preceding execution cycle of the program, and the control inputs u (k−1) calculated in a step 600 during the preceding execution cycle of the program. Specifically, the state variables $\hat{X}(k)$ are estimated by referring to the following equation corresponding to the equation (61).

$$X(k) = \begin{bmatrix} \hat{x}1(k) \\ \hat{x}2(k) \\ \hat{x}3(k) \\ \hat{x}4(k) \end{bmatrix}$$

$$= \begin{bmatrix} ao11 & ao12 & ao13 & ao14 \\ ao21 & ao22 & ao23 & ao24 \\ ao31 & ao32 & ao33 & ao34 \\ ao41 & ao42 & ao43 & ao44 \end{bmatrix} \begin{bmatrix} \hat{x}1(k-1) \\ \hat{x}2(k-1) \\ \hat{x}3(k-1) \\ \hat{x}4(k-1) \end{bmatrix} +$$

$$\begin{bmatrix} bo11 & bo12 \\ bo21 & bo22 \\ bo31 & bo32 \\ bo41 & bo42 \end{bmatrix} \begin{bmatrix} \delta V(k-1) \\ \delta EO(k-1) \end{bmatrix} +$$

$$\begin{bmatrix} l11 & l12 \\ l21 & l22 \\ l31 & l32 \\ l41 & l42 \end{bmatrix} \begin{bmatrix} \delta TE(k-1) \\ \delta SH(k-1) \end{bmatrix}$$

The process in the step 570 corresponds to the state estimator P36 of FIG. 17.

A step 580 following the step 570 determines feedback controlled quantities u FB(k), that is, the perturbation component VFB(k) of the compressor capacity and the perturbation component EOFB(k) of the expansion valve opening degree, in accordance with the state variables $\hat{X}(k)$ and the accumulated deviations Z (k) given in the steps 570 and 540 respectively, and with the feedback gains F. Specifically, the feedback controlled quantities u FB(k) are determined by referring to the following equation corresponding to the equation (69).

$$u\,FB(k) = \begin{bmatrix} \delta VFB(k) \\ \delta EOFB(k) \end{bmatrix}$$

$$= \begin{bmatrix} -f11 & -f12 & -f13 & -f14 & -f15 & -f16 \\ -f21 & -f22 & -f23 & -f24 & -f25 & -f26 \end{bmatrix} \cdot$$

$$[\hat{x}1(k)\ \hat{x}2(k)\ \hat{x}3(k)\ \hat{x}4(k)\ ZTE(k)\ ZSH(k)]^T$$

The process in the step 580 corresponds to the feedback control quantity determination section P41 of FIG. 17.

A step 590 following the step 580 determines feedforward controlled quantities u IF(k), that is, the perturbation component VFF(k) of the compressor capacity and the perturbation component EOFF(k) of the expansion valve opening degree, by referring to the following equation corresponding to the equation (70).

$$u\,FF(k) = \begin{bmatrix} \delta VFF(k) \\ \delta EOFF(k) \end{bmatrix} = [H1\ H2]^T \cdot \delta N(k)$$

The process in the step 590 corresponds to the feedforward controlled quantity calculation section P42.

A step 600 following the step 590 calculates perturbation controlled quantities u (k) by referring to the following equation.

$$u\,(k) = u\,FB(k) + u\,FF(k) = \begin{bmatrix} \delta VFB(k) \\ \delta EOFB(k) \end{bmatrix} + \begin{bmatrix} \delta VFF(k) \\ \delta EOFF(k) \end{bmatrix}$$

The process in the step 600 corresponds to the adders P43 and P44 of FIG. 17.

A step 610 following the step 600 determines a command or target capacity V(k) of the compressor 208b and a command or target opening degree EO(k) of the expansion valve 208e in accordance with the perturbation controlled quantities u (k) and the steady point values Va and EOa given in the steps 600 and 550. Specifically, the target compressor capacity V(k) equals the sum of the perturbation component δV(k) and the steady point value Va. The target expansion valve opening degree EO(k) equals the sum of the perturbation component δEO(k) and the steady point value EOa. The process in the step 610 corresponds to the reference value addition section P34 of FIG. 17.

A step 620 following the step 610 controls the compressor adjustment actuator 221 in accordance with the target compressor capacity V(k) so that the actual compressor capacity will be equal to the target compressor capacity V(k) given in the step 610. In addition, the step 620 controls the expansion valve drive actuator 225 in accordance with the target opening degree EO(k) so that the actual opening degree of the expansion valve 208e will be equal to the target opening degree EO(k) given in the step 10.

A step 630 following the step 620 increments the sampling timing K by "1". After the step 630, the current execution cycle of the program ends.

In this embodiment, the control of the refrigeration cycle 208 includes a feedforward section which acts against a disturbance caused by an abrupt change in the engine speed. This feedforward section ensures stable control of the refrigeration cycle 208 even when such a disturbance is applied to the refrigeration cycle 208.

Furthermore, even when such a disturbance is applied to the refrigeration cycle 208, the refrigerant superheat is held stable and the quantity of liquid back to the compressor 202b is maintained at a small value. Accordingly, the refrigerant superheat can be set to an extremely small level and thus the efficiency of the evaporator 208a can be high.

What is claimed is:

1. A control apparatus for a refrigeration arrangement including a heat exchanger and a compressor, the heat exchanger being disposed within an air duct having a downstream end opening into an interior of a vehicle, the compressor having a variable capacity, the control apparatus comprising:
    (a) means for detecting a physical quantity related to a condition of heat exchange of the heat exchanger;
    (b) means for setting a target value of the physical quantity;
    (c) means for calculating a difference between the detected physical quantity and the target value;
    (d) means for calculating a perturbation component of the detected physical quantity which is measured from a steady value of the physical quantity being predetermined relative to a dynamic model;
    (e) means for calculating a perturbation component of the compressor capacity on the basis of the difference, the physical quantity perturbation component, and a feedback gain, formed as an optimal regulator based on dynamic models which represent a relationship among the compressor capacity and the physical quantity in terms of perturbation components measured from respective steady values occurring when the refrigeration cycle operates under the steady states;
    (f) means for adding the compressor capacity perturbation component and a compressor capacity steady value being predetermined relative to the dynamic model;
    (g) means for adjusting the compressor capacity to the output of the adding means; and
    (h) means for changing the physical quantity steady value, the feedback gain and the compressor capacity steady value in accordance with a change in an operation condition of the refrigeration cycle, the physical quantity steady value, the feedback gain and the compressor capacity steady value being changeable among values predetermined for respective steady states.

2. The apparatus of claim 1 wherein the compressor capacity perturbation component calculation means comprises:
    (a) means for calculating a state variable of the refrigeration cycle on the basis of the physical quantity perturbation component and the compressor capacity perturbation component, the state variable being set in the dynamic model;
    (b) means for accumulating the difference and outputting an accumulated difference; and
    (c) means for calculating the compressor capacity perturbation component on the basis of the state variable, the accumulated difference, and the feedback gain.

3. The apparatus of claim 1 wherein the refrigeration cycle operating condition includes a rate of air flow through the heat exchanger.

4. The apparatus of claim 1 wherein the refrigeration cycle operating condition includes an atmospheric temperature.

5. The apparatus of claim 1 wherein the refrigeration cycle operating condition includes a rate of air flow through a condenser provided in the refrigeration cycle.

6. A control apparatus for a refrigeration cycle with a heat exchanger and an expansion valve, the heat exchanger being disposed within an air duct having a downstream end opening into an interior of a vehicle, the expansion valve having a variable degree of opening, wherein a rate of refrigerant supply to the heat exchanger depends on the expansion valve opening degree, the control apparatus comprising:
 (a) means for detecting a physical quantity related to an evaporating condition of a refrigerant in the heat exchanger;
 (b) means for setting a target value of the physical quantity;
 (c) means for calculating a difference between the detected physical quantity and the target value;
 (d) means for calculating a perturbation component of the detected physical quantity which is measured from a steady value of the physical quantity being predetermined relative to a dynamic model;
 (e) means for calculating a perturbation component of the refrigerant supply rate on the basis of the difference, the physical quantity perturbation component, and a feedback gain, formed as an optimal regulator based on dynamic models which represent relationship among the refrigerant supply rate and the physical quantity in terms of perturbation components measured from respective steady values occurring when the refrigeration cycle operates under the steady states;
 (f) means for adding the refrigerant supply rate perturbation component and a refrigerant supply rate steady value being predetermined relative to the dynamic model;
 (g) means for adjusting the refrigerant supply rate to the output of the adding means; and
 (h) means for changing the physical quantity steady value, the feedback gain and the refrigerant supply rate steady value in accordance with a change in an operating condition of the refrigeration cycle, the physical quantity steady value, the feedback gain and the refrigerant supply rate steady value being changeable among values predetermined for respective steady states.

7. The apparatus of claim 6 wherein the refrigerant supply rate perturbation component calculation means comprises:
 (a) means for calculating a state variable of the refrigeration cycle on the basis of the physical quantity perturbation component and the refrigerant supply rate perturbation component, the state variable being set in the dynamic model;
 (b) means for accumulating the difference and outputting an accumulated difference: and
 (c) means for calculating the refrigerant supply rate perturbation component on the basis of the state variable, the accumulated difference, and the feedback gain.

8. Th apparatus of claim 6 wherein the refrigeration cycle operation condition includes a rate of air flow through the heat exchanger.

9. The apparatus of claim 6 wherein the refrigeration cycle operating condition includes an atmospheric temperature.

10. The apparatus of claim 8 wherein the refrigeration cycle operating condition includes a rate of air flow through a condenser provided in the refrigeration cycle.

11. A refrigeration cycle control apparatus comprising:
 (a) an evaporator disposed within an air duct having a downstream end opening into a room, the evaporator cooling air by evaporating refrigerant circulating through a refrigeration cycle;
 (b) a compressor provided in the refrigeration cycle and having a variable capacity;
 (c) an expansion valve having a variable degree of opening, wherein a rate of refrigerant supply to the evaporator depends on the expansion valve opening degree;
 (d) means for detecting a first physical quantity related to a condition of heat exchange of the heat exchanger:
 (e) means for setting a target value of the first physical quantity;
 (f) means for detecting a second physical quantity related to an evaporating condition of a refrigerant in the evaporator;
 (g) means for setting a target value of the second physical quantity;
 (h) means for calculating differences between the first detected physical quantity and the first target value, and between the second detected physical quantity and the second target value;
 (i) means for calculating perturbation components of the first and second detected physical quantity which are measured from steady values of the first and second physical quantity being predetermined relative to a dynamic model;
 (j) means for calculating perturbation components of the compressor capacity and the refrigerant supply rate on the basis of the differences, the first and second physical quantity perturbation components, and a feedback gain, the perturbation formed as an optimal regulator based on dynamic models which represent a relationship among the compressor capacity, the refrigerant supply rate, the first physical quantity and the second physical quantity in terms of perturbation components measured from respective steady values occurring when the second physical quantity in terms of perturbation components measured from respective steady values occurring when the refrigeration cycle operates under the steady states;
 (k) means for adding the perturbation components and the steady values of the compressor capacity and the refrigerant supply rate;
 (l) means for adjusting the compressor capacity to the output of the adding means;
 (m) means for adjusting the refrigerant supply rate to the output of the adding means;
 (n) means for changing the steady values of the first and second physical quantity, the feedback gain, and the steady values of the compressor capacity and the refrigerant supply rate in accordance with a change in an operating condition of the refrigeration cycle, the steady values of the first and second physical quantity, the feedback gain, and the steady values of the compressor capacity and the refrigerant supply rate being changeable among values predetermined for respective steady states.

12. The apparatus of claim 11 wherein the compressor capacity and the refrigerant supply rate perturbation components calculating means comprises:
   (a) means for calculating a state variable of the refrigeration cycle on the basis of the first and second physical quantity perturbation components, the compressor capacity perturbation component, and the refrigerant supply rate perturbation component, the state variable being set in the dynamic model;
   (b) means for accumulating the differences of the first and second physical quantity respectively, and outputting accumulated differences; and
   (c) means for calculating the compressor capacity perturbation component and the refrigerant supply rate perturbation component on the basis of the state variable, the accumulated differences, and the feedback gain.

13. A control apparatus for a refrigeration cycle with a heat exchanger and a compressor, the heat exchanger being disposed within an air duct having a downstream end opening into an interior of a vehicle, the compressor having a variable capacity, the control apparatus comprising:
   (a) means for detecting a physical quantity related to a condition of heat exchange of the heat exchanger;
   (b) means for setting a target value of the physical quantity;
   (c) means for calculating a difference between the detected physical quantity and the target value;
   (d) means for calculating a perturbation component of the detected physical quantity which is measured from a steady value of the physical quantity being predetermined relative to a dynamic model;
   (e) means for detecting a disturbance applied to the refrigeration cycle;
   (f) means for calculating a perturbation component of the detected disturbance which is measured from a steady value of the disturbance being predetermined relative to the dynamic model;
   (g) means for calculating a perturbation component of the compressor capacity on the basis of the difference, the physical quantity perturbation component, and a feedback gain, and a feedforward gain, formed as an optimal regulator based on dynamic models which represent a relationship among the compressor capacity and the physical quantity in terms of perturbation components measured from respective steady values occurring when the refrigeration cycle operates under the steady states;
   (h) means for adding the compressor capacity perturbation component and a compressor capacity steady value being predetermined relative to the dynamic model;
   (i) means for adjusting the compressor capacity to the output of the adding means; and
   (j) means for changing the physical quantity steady value, the feedback gain, the feedforward gain, and the compressor capacity steady value in accordance with a change in an operating condition of the refrigeration cycle, the physical quantity steady value, the disturbance steady value, the feedback gain, the feedforward gain, and the compressor capacity steady value being changeable among values predetermined for respective steady states used for determining dynamic models.

14. The apparatus of claim 13 wherein the compressor capacity perturbation component calculation means comprises:
   (a) means for calculating a state variable of the refrigeration cycle on the basis of the physical quantity perturbation component and the compressor capacity perturbation component, the state variable being set in the dynamic model;
   (b) means for accumulating the difference and outputting an accumulated difference;
   (c) means for calculating a feedback compressor capacity perturbation component on the basis of the state variable, the accumulated difference, and the feedback gain;
   (d) means for calculating a feedforward compressor capacity perturbation component on the basis of the disturbance perturbation component, and the feedforward gain; and
   (e) means for calculating the compressor capacity perturbation component which is an addition of the feedback compressor capacity perturbation component and the feedforward compressor capacity perturbation component.

15. A control apparatus for a refrigeration cycle with a heat exchanger and an expansion valve, the heat exchanger being disposed within an air duct having a downstream end opening into an interior of a vehicle, the expansion valve having a variable degree of opening, wherein a rate of refrigerant supply to the heat exchanger depends on the expansion valve opening degree, the control apparatus comprising:
   (a) means for detecting a physical quantity related to an evaporating condition of a refrigerant in the heat exchanger;
   (b) means for setting a target value of the physical quantity;
   (c) means for calculating a difference between the detected physical quantity and the target value;
   (d) means for calculating a perturbation component of the detected physical quantity which is measured from a steady value of the physical quantity being predetermined relative to a dynamic model;
   (e) means for detecting a disturbance applied to the refrigeration cycle;
   (f) means for calculating a perturbation component of the detected disturbance which is measured from a steady value of the disturbance being predetermined relative to the dynamic model;
   (g) means for calculating a perturbation component of the refrigerant supply rate on the basis of the difference, the physical quantity perturbation component, and a feedback gain, and a feedforward gain, formed as an optimal regulator based on dynamic models which represent a relationship among the refrigerant supply rate and the physical quantity in terms of perturbation components measured from respective steady values occurring when the refrigeration cycle operates under the steady states;
   (h) means for adding the refrigerant supply rate perturbation component and a refrigerant supply rate steady value being predetermined relative to the dynamic model;
   (i) means for adjusting the refrigerant supply rate to the output of the adding means; and
   (j) means for changing the physical quantity steady value, the feedback gain, the feedforward gain, and the refrigerant supply rate steady value in accordance with a change in an operating condition of the refrigeration cycle, the physical quantity steady value, the disturbance steady value, the feedback gain, the feedforward gain, and the refrigerant supply rate steady value being changeable among values predetermined for respective steady states used for determining dynamic models.

16. The apparatus of claim 15 wherein the refrigerant supply rate perturbation component calculation means comprises:
   (a) means for calculating a state variable of the refrigeration cycle on the basis of the physical quantity perturbation component and the refrigerant supply rate perturbation component, the state variable being set in the dynamic model;
   (b) means for accumulating the difference and outputting an accumulated difference;
   (c) means for calculating a feedback refrigerant supply rate perturbation component on the basis of the state variable, the accumulated difference, and the feedback gain;
   (d) means for calculating a feedforward refrigerant supply rate perturbation component on the basis of the disturbance perturbation component, and the feedforward gain; and
   (e) means for calculating the refrigerant supply rate perturbation component which is an addition of the feedback refrigerant supply rate perturbation component and the feedforward refrigerant supply rate perturbation component.

17. A refrigeration cycle control apparatus comprising:
   (a) an evaporator disposed within an air duct having a downstream end opening into a room, the evaporator cooling air by evaporating refrigerant circulating through a refrigeration cycle;
   (b) a compressor provided in the refrigeration cycle and having a variable capacity;
   (c) an expansion valve having a variable degree of opening, wherein a rate of refrigerant supply to the evaporator depends on the expansion valve opening degree;
   (d) means for detecting a first physical quantity related to a condition of heat exchange of the heat exchanger;
   (e) means for setting a target value of the first physical quantity;
   (f) means for detecting a second physical quantity related to an evaporating condition of a refrigerant in the evaporator;
   (g) means for setting a target value of the second physical quantity;
   (h) means for calculating differences between the first detected physical quantity and the first target value, and between the second detected physical quantity and the second target value;
   (i) means for calculating perturbation components of the first and second detected physical quantity which are measured from steady values of the first and second physical quantity being predetermined relative to the dynamic model;
   (j) means for detecting a disturbance applied to the refrigeration cycle;
   (k) means for calculating a perturbation component of the detected disturbance which is measured from a steady value of the disturbance being predetermined relative to the dynamic model;
   (l) means for calculating perturbation components of the compressor capacity and the refrigerant supply rate on the basis of the differences, the first and second physical quantity perturbation components, the disturbance perturbation component, a feedback gain, and a feedforward gain, formed as an optimal regulator based on dynamic models which represent a relationship among the compressor capacity, the refrigerant supply rate, the first physical quantity and the second physical quantity in terms of perturbation components measured from respective steady values occurring when the refrigeration cycle operates under the steady states;
   (m) means for adding the perturbation components and the steady values of the compressor capacity and the refrigerant supply rate being predetermined relative to the dynamic model;
   (n) means for adjusting the compressor capacity to the output of the adding means;
   (o) means for adjusting the refrigerant supply rate to the output of the adding means;
   (p) means for changing the steady values of the first and second physical quantity, the disturbance steady value, the feedback gain, the feedforward gain, and the steady values of the compressor capacity and the refrigerant supply rate in accordance with a change in an operating condition of the refrigeration cycle, the steady values of the first and second physical quantity, the disturbance steady value, the feedback gain, the feedforward gain, and the steady values of the compressor capacity and the refrigerant supply rate being changeable among values predetermined for respective steady states.

18. The apparatus of claim 17 wherein the compressor capacity and refrigerant supply rate perturbation component calculation means comprises:
   (a) means for calculating a state variable of the refrigeration cycle on the basis of the physical quantity perturbation components and the compressor capacity and the refrigerant supply rate perturbation components, the state variable being set in the dynamic model;
   (b) means for accumulating the differences and outputting accumulated differences;
   (c) means for calculating a feedback compressor capacity and a feedback refrigerant supply rate perturbation components on the basis of the state variable, the accumulated differences, and the feedback gain;
   (d) means for calculating a feedforward compressor capacity and a feedforward refrigerant supply rate perturbation components on the basis of the disturbance perturbation component, and the feedforward gain;
   (e) means for calculating the compressor capacity perturbation component which is an addition of the feedback compressor capacity perturbation component and the feedforward compressor capacity perturbation component; and
   (f) means for calculating the refrigerant supply rate perturbation component which is an addition of the feedback refrigerant supply rate perturbation component and the feedforward refrigerant supply rate perturbation component.

19. A control apparatus for a refrigeration cycle with a heat exchanger and a compressor, the heat exchanger being disposed within an air duct having a downstream end opening into an interior of a vehicle, the compressor having a variable capacity, the control apparatus comprising:
- (a) means for detecting a physical quantity related to a condition of heat exchange of the heat exchanger;
- (b) means for calculating a command value of the compressor capacity, formed as an optimal regulator based on dynamic models which represent a relationship among the compressor capacity and the physical quantity, the optimal regulator being designed to move and hold the physical quantity toward and at a target value while minimizing a variation in the compressor capacity, the optimal regulator calculating the command value by operating a predetermined feedback gain on the physical quantity and a state variable of the refrigeration cycle which is calculated from a state equation representing the dynamic model, the physical quantity, and the compressor capacity; and
- (c) means for adjusting the compressor capacity to the command value.

20. A control apparatus for a refrigeration cycle with a heat exchanger and an expansion valve, the heat exchanger being disposed within an air duct having a downstream end opening into an interior of a vehicle, the expansion valve having a variable degree of opening, wherein a rate of refrigerant supply to the heat exchanger depends on the expansion valve opening degree, the control apparatus comprising:
- (a) means for detecting a physical quantity related to an evaporating condition of a refrigerant in the heat exchanger;
- (b) means for calculating a command value of the refrigerant supply rate, formed as an optimal regulator based on dynamic models which represent a relationship among the refrigerant supply rate and the physical quantity, the optimal regulator being designed to move and hold the physical quantity toward and at a target value while minimizing a variation in the refrigerant supply rate, the optimal regulator calculating the command value by operating a predetermined feedback gain on the physical quantity and a state variable of the refrigeration cycle which is calculated from a state equation representing the dynamic model, the physical quantity, and the refrigerant supply rate; and
- (c) means for adjusting the refrigerant supply rate to the command value.

21. An air conditioner control apparatus comprising:
- (a) an evaporator disposed within an air duct having a downstream end opening into a room, the evaporator cooling air by evaporating refrigerant circulating through a refrigeration cycle;
- (b) means, provided in the refrigeration cycle, for
- (c) means for detecting the cooling ability of the evaporator;
- (d) means, disposed within a region of the duct downstream of the evaporator, for heating air and adjusting a temperature of air discharged into the room;
- (e) means for detecting a temperature of air within the room;
- (f) means for setting a target value of the cooling ability of the evaporator;
- (g) means for setting a target value of the air temperature in the room;
- (h) means for accumulating a difference between the detected cooling ability and the target cooling ability;
- (i) means for accumulating a difference between the detected air temperature and the target air temperature; and
- (j) means for determining command values of controlled quantities of the cooling ability adjustment means and the air temperature adjustment means in accordance with the detected cooling ability, the detected air temperature, the cooling ability accumulated difference, the air temperature accumulated difference, and a feedback gain, the command value determination means being formed as an integral-added optimal regulator feedback-controlling a system having controlled inputs composed of the controlled quantities of the cooling ability adjustment means and the air temperature adjustment means and control outputs composed of the cooling ability and the air temperature, the feedback gain being predetermined o the basis of a dynamic model of the system.

22. The apparatus of claim 21 wherein the command value determination means comprises:
- (a) means for calculating perturbation components of the detected air temperature and the detected cooling ability, the perturbation components being measured from steady values of the air temperature and the cooling ability which occur when an air conditioner operates under a predetermined steady state;
- (b) means for calculating perturbation components of the controlled quantities of the compressor capacity adjustment means and the air temperature adjustment means on the basis of the air temperature perturbation component, the cooling ability perturbation component, the air temperature accumulated difference, and the cooling ability accumulated difference, the compressor capacity perturbation component and the air temperature perturbation component being measured from steady values of the compressor capacity and the air temperature which occur when the air conditioner operates under the predetermined steady state; and
- (c) means for adding the compressor capacity perturbation component and the compressor capacity steady value, and adding the air temperature perturbation component and the air temperature steady value.

* * * * *